US011855782B2

(12) United States Patent
Wang et al.

(10) Patent No.: US 11,855,782 B2
(45) Date of Patent: Dec. 26, 2023

(54) METHOD AND APPARATUS FOR TRANSMITTING UPLINK SIGNAL

(71) Applicant: Samsung Electronics Co., Ltd., Suwon-si (KR)

(72) Inventors: Yi Wang, Beijing (CN); Yingyang Li, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 455 days.

(21) Appl. No.: 17/279,418

(22) PCT Filed: Sep. 27, 2019

(86) PCT No.: PCT/KR2019/012665
§ 371 (c)(1),
(2) Date: Mar. 24, 2021

(87) PCT Pub. No.: WO2020/067815
PCT Pub. Date: Apr. 2, 2020

(65) Prior Publication Data
US 2022/0014314 A1    Jan. 13, 2022

(30) Foreign Application Priority Data

Sep. 27, 2018  (CN) .......................... 201811134052.2
Jan. 9, 2019   (CN) .......................... 201910018758.0
(Continued)

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1864* (2013.01); *H04W 72/0446* (2013.01); *H04W 74/008* (2013.01)

(58) Field of Classification Search
CPC ... H04L 1/1812; H04L 1/1864; H04L 1/0025; H04L 1/1819; H04L 1/1822; H04L 1/08;
(Continued)

(56) References Cited

U.S. PATENT DOCUMENTS

2011/0085513 A1    4/2011   Chen et al.
2015/0085674 A1    3/2015   Wu
(Continued)

FOREIGN PATENT DOCUMENTS

EP    3 279 384 A1    2/2018
WO    2016/119232 A1  8/2016

OTHER PUBLICATIONS

European Search Report dated Nov. 19, 2021; European Appln. No. 19865997.1-1205 / 3857801 PCT/KR2019012665.
(Continued)

*Primary Examiner* — Kyaw Z Soe
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure discloses a method and an apparatus for transmitting an uplink signal, and the method comprises: receiving downlink control information; and performing transmitting of the uplink signal according to the downlink control information and/or a time-domain attribute of a physical resource of the uplink signal. With the present
(Continued)

disclosure, a flexibility of a system can be improved and a transmission efficiency can be increased.

15 Claims, 11 Drawing Sheets

(30) Foreign Application Priority Data

| Apr. 30, 2019 | (CN) | 201910361164.X |
|---|---|---|
| Aug. 15, 2019 | (CN) | 201910755542.2 |
| Aug. 16, 2019 | (CN) | 201910759598.5 |
| Aug. 26, 2019 | (CN) | 201910792505.9 |

(51) Int. Cl.
*H04W 72/0446* (2023.01)
*H04W 74/00* (2009.01)

(58) Field of Classification Search
CPC ... H04L 1/1887; H04L 1/1893; H04L 5/0048; H04L 5/0053; H04L 5/0055; H04W 72/0446; H04W 74/008; H04W 72/23; H04W 72/1268; H04W 74/0808
See application file for complete search history.

(56) References Cited

U.S. PATENT DOCUMENTS

| 2016/0021651 A1 | 1/2016 | Ko et al. |
| 2017/0215172 A1 | 7/2017 | Yang et al. |
| 2021/0092762 A1* | 3/2021 | Choi ............ H04L 5/0055 |

OTHER PUBLICATIONS

Samsung, "HARQ enhancements for NR-U", 3GPP TSG RAN WG1 Meeting #94, R1-1808770, Gothenburg, Sweden, Aug. 11, 2018.
LG Electronics, "Discussion on configured grant for NR unlicensed operation", 3GPP TSG RAN WG1 Meeting #94, Gothenburg, Sweden, R1-1808510, Aug. 11, 2018.

* cited by examiner

METHOD AND APPARATUS FOR TRANSMITTING UPLINK SIGNAL

TECHNICAL FIELD

The present disclosure relates to a field of mobile communication technique, particularly, to a method and an apparatus for transmitting uplink signals, a method and a device for transmitting and receiving an uplink data channel, a control channel, an random access channel and a downlink control channel.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With rapid developments of information industry, especially growth demands from the mobile internet and an Internet of Things (IoT), it brings unprecedented challenges to future mobile communication technologies. According to a report ITU-R M.[IMT.BEYOND 2020.TRAFFIC] from the International Telecommunication Union (ITU), it is expected that by 2020, mobile traffic growth will increase nearly 1000 times compared to 2010 (4G era), and the number of UE connections will also exceed 17 billion. As the massive IoT devices gradually penetrate into the mobile communication network, the number of connected devices will be even more amazing. In response to this unprecedented challenge, the communications industry and academia have launched a wide range research of fifth-generation mobile communications technology (5G) for 2020. In 3GPP, the first phase of the 5G work has basically ended, and the second phase of the 5G work has begun.

In order to meet the huge traffic demand, the 5G system is expected to work in the low frequency band up to the high frequency resource of about 100G, including licensed bands and unlicensed bands. Among them, the unlicensed frequency band mainly considers the 5 GHz band and the 60 GHz band. We refer to the 5G system working in the unlicensed band as a NR-U system, which can include: scenarios that work independently on the unlicensed bands; scenarios that work with the licensed bands through a Dual Connectivity (DC), as illustrated in FIG. 1; and scenarios that work with the licensed band by Carrier Aggregation (CA). In the 5 GHz band, the 802.11 series of Wireless Fidelity (WiFi) systems, radar, and LTE's authorized carrier-assisted access LAA system have been deployed, and the channel access is followed by the LBT (Listen before talk) mechanism, that is, the wireless channel must be sensed before the signal is transmitted, and the wireless channel can be occupied to transmit the signal only when the wireless channel is sensed to be idle.

In the existing system, there are two ways to support the UE for uplink transmission. One is based on real-time scheduling of base stations, which we called as SUL (scheduled based UL grant). Before transmitting the signal, the UE needs to receive an uplink scheduling indication (UL grant) transmitted by the base station, and the UL grant includes information on a time-frequency resource that the UE sends a PUSCH, and the like. The UE transmits the PUSCH on the resource indicated by the UL grant. On the unlicensed frequency band, the base station needs to perform LBT for transmitting the UL grant, and the UE needs to perform LBT before the uplink subframe indicated by the UL grant. The PUSCH scheduled by the UL grant can be transmitted if both LBTs succeed. Another way is that the base station semi-statically configures the time-frequency resource. We call it as the UL transmission with configured grant (GUL). When the UE has data to transmit, the UE may try to transmit on these resources without scheduling by the base station. If there is no data, no transmission is needed. On the unlicensed band, the UE needs to perform LBT before uplink transmission, and if succeeds, UE can send the PUSCH on the configured resources. In the PUSCH transmitted by the GUL, the UE may send both the uplink data and uplink control information (UCI), for example, a symbol for indicating start and end of the PUSCH, a hybrid automatic repeat request HARQ information (such as a NDI, RV, HARQ_ID, etc.), a UE identity information (UE ID), and the like. In 5G systems, both uplink transmission methods can be considered for transmission in the licensed and unlicensed bands.

In order to support a GUL-based retransmission, the base station may explicitly indicate a HARQ-ACK information of the PUSCH transmitted by the GUL through a special downlink control signaling (DCI). The UE may determine whether to perform a retransmission or a new transmission according to the received HARQ-ACK information. On the unlicensed frequency band, the UE may further adjust a Contention Window Size (CWS) of the LBT according to the received HARQ-ACK information. How does the UE determine whether the received HARQ-ACK information is valid, how to determine the adjustment of the CWS based on the HARQ-ACK information, and how to determine behaviors of the GUL transmission based on the HARQ-ACK information, how to improve an accuracy of the LBT and improve an efficiency of GUL transmission, need to be solved.

In addition, when the UE is semi-statically configured to receive downlink physical channels, such as PDSCH, repeated for K times, or to transmit uplink physical channels, such as PUSCH, repeated for K times, how to utilize the resource information semi-statically configured by the base station, and how to utilize the resource information dynamically indicated by the base station, determining how to perform the K-time PDSCH reception or K-time PUSCH transmission, and reducing an impact of LBT on a transmission efficiency in the unlicensed frequency band, also require a corresponding solution.

The LBT mechanism can be divided into two types. One is called as a first type of LBT, commonly known as Category 4 LBT (TS 37.213), which randomly generates a backoff factor X according to the CWS. If X clear channel assessment time slots (CCA slots) are idle, a signal can be transmitted. The first type of LBT is divided into four LBT priority classes, which correspond to different QCI (Quality Criterion Indicators). For different LBT priority classes, the sizes of CWS are different (that is, sets of CW values are different), backoff time units (defer period, which is equal to 16+9*n microseconds, n is an integer greater than or equal to 1) are different, and their Maximum Channel Occupancy Times (MCOTs) are also different, as shown in Table 1 below. The other is called as a second type LBT (TS 37.213), and the transmitter only needs to perform a 25 us (microsecond) Clear Channel Assessment (CCA) detection before a start of transmission signal. If the channel is idle, the signal can be transmitted.

DISCLOSURE OF INVENTION

Technical Problem

There is a need for an effective signal transmission method and retransmission method.

Solution to Problem

The present disclosure is provided to address problems described above and provide advantages as follows at least.

According to an aspect of the present disclosure, there is provided a method for transmitting an uplink signal, comprising: receiving downlink control information; and performing transmitting of the uplink signal according to a time-domain attribute of a physical resource of the downlink control information and/or the uplink signal.

Wherein the downlink control information includes Hybrid Automatic Repeat Request (HARQ)-ACK feedback information which is the HARQ-ACK information for PUSCH for one or more HARQ processes of an UE carried by a special DCI by a base station. Wherein a determination of the uplink signal comprises: determining to terminate transmitting the uplink signal, or continue to transmit the uplink signal, or retransmit the uplink signal.

Wherein for an UL transmission with configured grant (GUL)PUSCH configured to be transmitted for K times, the performing transmitting of the uplink signal according to the time-domain attribute of the physical resource of the downlink control information and/or the uplink signal comprises at least one of: the UE terminates transmitting of the remaining repeated GUL PUSCH transmissions, if at timing m the UE receives the HARQ-ACK feedback information wherein the HARQ-ACK for the HARQ process corresponding to the GUL PUSCH is ACK and the GUL PUSCH of the HARQ process has been transmitted at least K_a times before timing m−m_dfi, wherein K_a<K and m_dfi is a predefined minimum processing delay; the UE continues to transmit the repeated GUL PUSCHs until the transmission reaches to the K times or an ACK is received, if at timing m the UE receives the HARQ-ACK feedback information wherein the HARQ-ACK corresponding to the HARQ process is NACK but the UE has not completed the K times of retransmissions at timing m; and the UE tries to retransmit the GUL PUSCH on a configured GUL resource, if at timing m the UE receives the HARQ-ACK feedback information wherein the HARQ-ACK corresponding to the HARQ process is NACK and UE has completed the K times of retransmissions of the GUL PUSCHs corresponding to the HARQ process at timing m.

Wherein the performing transmitting of the uplink signal according to the time-domain attribute of the physical resource of the downlink control information and/or the

TABLE 1 sets of CW values, MCOT and backoff parameter n corresponding to respective LBT priority classes

| LBTpriority class | nn | $CW_{min}$ | $CW_{max}$ | MCOT | Sets of CWp size (sets of CWp value) |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} | uplink signal comprises: determining a start point of the GUL PUSCH transmission according to the time-domain attributes of the physical resources of the downlink control information and an uplink data channel signal PUSCH; and performing the GUL PUSCH transmission according the determined start point; and/or determining a start point of a GUL PUCCH transmission according to the time-domain attributes of the physical resources of the downlink control information and an uplink data channel signal PUCCH; and performing the GUL PUCCH transmission according the determined start point.

Wherein the downlink control information comprises information for determining an uplink and/or a downlink and/or a flexible slot/symbol or information for indicating a Channel Occupied Time (COT). The determining the start point of the GUL PUSCH transmission according to the time-domain attributes of the physical resources of the downlink control information and the uplink data channel signal comprises at least one of: determining, as the start point, a slot/symbol causing GUL resources corresponding to the K times transmissions of the GUL PUSCHs to be continuous in time; determining, as the start point, a slot/symbol causing the GUL resources corresponding to the K times transmissions of the GUL PUSCHs to be within a same GUL resource period; determining, as the start point, a slot/symbol causing the GUL resources corresponding to the K times transmissions of the GUL PUSCHs to be within a same COT.

Wherein the performing transmitting of the uplink signal according to the time-domain attribute of the physical resource of the downlink control information and/or the uplink signal comprises: determining a number of times of the GUL PUSCH transmissions according to the time-domain attributes of the physical resources of the downlink control information and the uplink data channel signal PUSCH; and performing the GUL PUSCH transmissions according to the determined number of times; and/or determining a number of times of the GUL PUSCH transmissions according to the time-domain attributes of the physical resources of the downlink control information and the uplink data channel signal PUCCH; and performing the GUL PUSCH transmissions according to the determined number of times.

Wherein the downlink control information comprises information for determining an uplink and/or a downlink and/or a flexible slot/symbol or information for indicating a Channel Occupied Time (COT). The determining a number of times of the GUL PUSCH transmissions according to the time-domain attributes of the physical resources of the downlink control information and the uplink data channel signal PUSCH comprises at least one of: if the GUL resources corresponding to the K times transmissions of the GUL PUSCHs are discontinuous in time, the UE transmits the PUSCH only on continuous GUL resources for K_c times and abandons the k−k_c times of GUL PUSCH transmissions corresponding to the discontinuous GUL resources, wherein K_c<K; if the GUL resources corresponding to the K times retransmissions of the GUL PUSCHs span GUL resource configuration periods, the UE transmits the PUSCH only on the GUL resources within one period for K_c times and abandons the k−k_c times of GUL PUSCH transmissions corresponding to the GUL resources after the one period, wherein K_c<K; if a portion of GUL resources corresponding to the K times of GUL PUSCH transmissions are outside of one COT, the UE transmits the GUL PUSCHs only on the GUL resources within a same COT for K_c times and abandons the k−k_c times of GUL PUSCH transmissions corresponding to the GUL resources outside of the COT, wherein K_c<K; if a portion of GUL resources corresponding to the K times of GUL PUSCH transmissions are outside of one COT, the UE performs a first type of channel access procedure and then transmits the GUL PUSCH transmissions for K_d times, wherein K_d is not greater than K and causes the K_d times of GUL PUSCH transmissions do not exceed a length of COT acquired by the UE through the first type of channel access procedure; if a portion of GUL resources corresponding to the K times of GUL PUSCH transmissions are outside of one COT, the UE determines whether the K times of GUL PUSCH transmissions would be terminated or continued at an end of the COT according to an indication from the base station.

Wherein K_c≥a threshold value predetermined; the threshold value is predetermined or configured as the base station configures the GUL; alternatively, the threshold value corresponds to a traffic type, and/or logic channel born by the PUSCH, and/or a Redundancy Version (RV) of the PUSCH.

Wherein the downlink control information comprises the HARQ-ACK feedback information, and the HARQ-ACK feedback information is the HARQ-ACK information for PUSCH for one or more HARQ processes of the UE carried by the special DCI by the base station. The performing transmitting of the uplink signal according to the time-domain attribute of the physical resource of the downlink control information and/or the uplink signal comprises: determining a Contention Window Size (CWS) of the channel access procedure before a transmitting of the uplink data channel signal according to the time-domain attribute of the physical resource of the downlink control information and the uplink data channel signal PUSCH, and transmitting the uplink signal after performing the channel access according to the CWS.

Wherein the determining a Contention Window Size (CWS) of the channel access procedure before a transmitting of the uplink signal comprises determining the CWS according to the HARQ-ACK information, wherein a time difference between a timing m at which the UE receives the HARQ-ACK information and a timing n at which the UE transmits the PUSCH corresponding to the HARQ-ACK information is not smaller than m_dfi_0, wherein m_dfi_0 is a predetermined minimum process delay; m_dfi_0 is in a unit of slot or an OFDM symbol.

Wherein for the GUL PUSCHs configured to be retransmitted for K times, determining a Contention Window Size (CWS) of the channel access procedure before a transmitting of the uplink signal comprises at least one of: the UE determines the CWS according to the HARQ-ACK information, wherein the UE receives the HARQ-ACK feedback information at timing m, the HARQ-ACK corresponding to the HARQ process is ACK, and the PUSCH of the HARQ process has been transmitted at least K_a times before timing m-m_dfi_0, wherein K_a<K; the UE determines the CWS according to the HARQ-ACK information, wherein the HARQ-ACK information satisfying following conditions is not used for the determining of the CWS: for the GUL PUSCH configured to be retransmitted for K times, if the UE receives the HARQ-ACK feedback information at timing m wherein the HARQ-ACK corresponding to the HARQ process is NACK, and a times of transmission of PUSCHs of the HARQ process before timing m−m_dfi_0 is smaller than K_b. wherein m_dfi_0 is the predetermined process delay; and m_dfi_0 is in a unit of slot or OFDM symbol.

Wherein the PUSCH is the first PUSCH in the last uplink transmission satisfying the time difference; or the PUSCH is all PUSCHs satisfying the time difference during a first slot in the last uplink transmission satisfying the time difference; or the PUSCH is a PUSCH satisfying the time difference and being earliest in time during the first slot in the last uplink transmission satisfying the time difference.

Wherein the downlink control information comprises information for determining an uplink and/or a downlink and/or a flexible slot/symbol or information for indicating a Channel Occupied Time (COT). When the uplink signal comprises an uplink signal configured semi-statically, the performing transmitting of the uplink signal according to the time-domain attributes of the physical resources of the downlink control information and the uplink signal comprises at least one of: for a transmission of the uplink signal configured semi-statically, if transmission resources for the uplink signal selected by the UE are the uplink and/or flexible slots/symbols configured semi-statically and the UE fails to receive the downlink control information indicating a part or all of resources for the uplink signal being downlink slots/symbols, the UE tries to transmit the uplink signal on the selected transmission resources; for the transmission of the uplink signal configured semi-statically, if transmission resources for the uplink signal selected by the UE are the uplink and/or flexible slots/symbols configured semi-statically and the UE fails to receive the downlink control information indicating a part or all of resources being downlink and/or flexible slots/symbols, the UE tries to transmit the uplink signal on the selected transmission resources, otherwise no uplink signal is transmitted; for the transmission of the uplink signal configured semi-statically, if the transmission resources for the uplink signal selected by the UE are uplink and/or flexible slots/symbols and a port or all of the resources for the uplink signal are located between two adjacent slot format indications SFI, and the UE fails to receive the downlink control information indicating uplink/downlink/flexible slots/symbols of a part or all of the resources of the uplink signal, the UE may tries to transmit the uplink signal on the resources for the uplink signal before a SFI slot possibly received just next time; if the SFI is received at the SFI slot, determining whether the transmitting of the uplink signal is continued or terminated according to the SFI indication.

The uplink signal comprises a PUSCH, a PUCCH and a PRACH. Transmitting of the uplink signal is different on at least two of the PUSCH, PUCCH and PRACH.

Wherein the downlink control information indicates the downlink slot/symbol, the uplink slot/symbol, the flexible slot/symbol and a special flexible slot/symbol.

Wherein a transmission period of the downlink control information is K0, and the downlink control information indicates the downlink slot/symbol, the uplink slot/symbol and the flexible slot/symbol for X slots; and in a certain transmission period of the downlink control information, the last K0-X slots are the special flexible slot/symbol.

Wherein the UE tries to transmit the predetermined uplink signal configured semi-statically in the special flexible slot/symbol indicated by the downlink control information; and/or, the UE does not transmit the predetermined uplink signal configured semi-statically in the flexible slot/symbol indicated by the downlink control information.

Wherein in an adjusting of the CWS in the channel access procedure, for all HARQ-ACKs available to the adjusting of the CWS, if a percentage of ACK exceeds a predetermined threshold or a percentage of NACK is below a predetermined threshold, the CWS is reset, otherwise the CWS is increased to a next greater available value.

Wherein the downlink control information comprises information for determining a time resource pattern of a DMRS and/or the PUSCH in M PUSCH slots scheduled continuously.

Wherein the downlink control information comprises information for determining a time resource for a Sounding Reference Signal (SRS), at least one of information indicating that the SRS is located at a same slot as a slot offset of a DCI triggering the SRS or information indicating that the SRS is located at a same slot as a PUSCH and/or PUCCH scheduled by a DCI triggering the SRS.

According to an aspect of the present disclosure, there is further provided an apparatus for transmitting an uplink signal, comprising: a receiver for receiving downlink control information; and a transmitter for transmitting the uplink signal according to time-domain attribute of a physical resource of the downlink control information and/or the uplink signal.

Advantageous Effects of Invention

According to the present disclosure, a wireless communication may be performed more efficiently.

BRIEF DESCRIPTION OF DRAWINGS

The present disclosure will become more fully understood from the detailed description given hereinafter and the accompanying drawings which are given by way of illustration only, and thus are not limitative of the present disclosure and wherein.

MODE FOR THE INVENTION

The following description is provided in connection with drawings to assist understanding of the embodiments of the present disclosure defined by the Claims and equivalent thereof. Various special details are included to assist the understanding, but such details are only considered as exemplary. Accordingly, it will be apparent to those skilled in the art that various changes and modifications may be made to the embodiments described herein without departing from the scope and spirit of the invention. In addition, descriptions of well-known functions and structures are omitted for clarity and conciseness.

Figure 1:
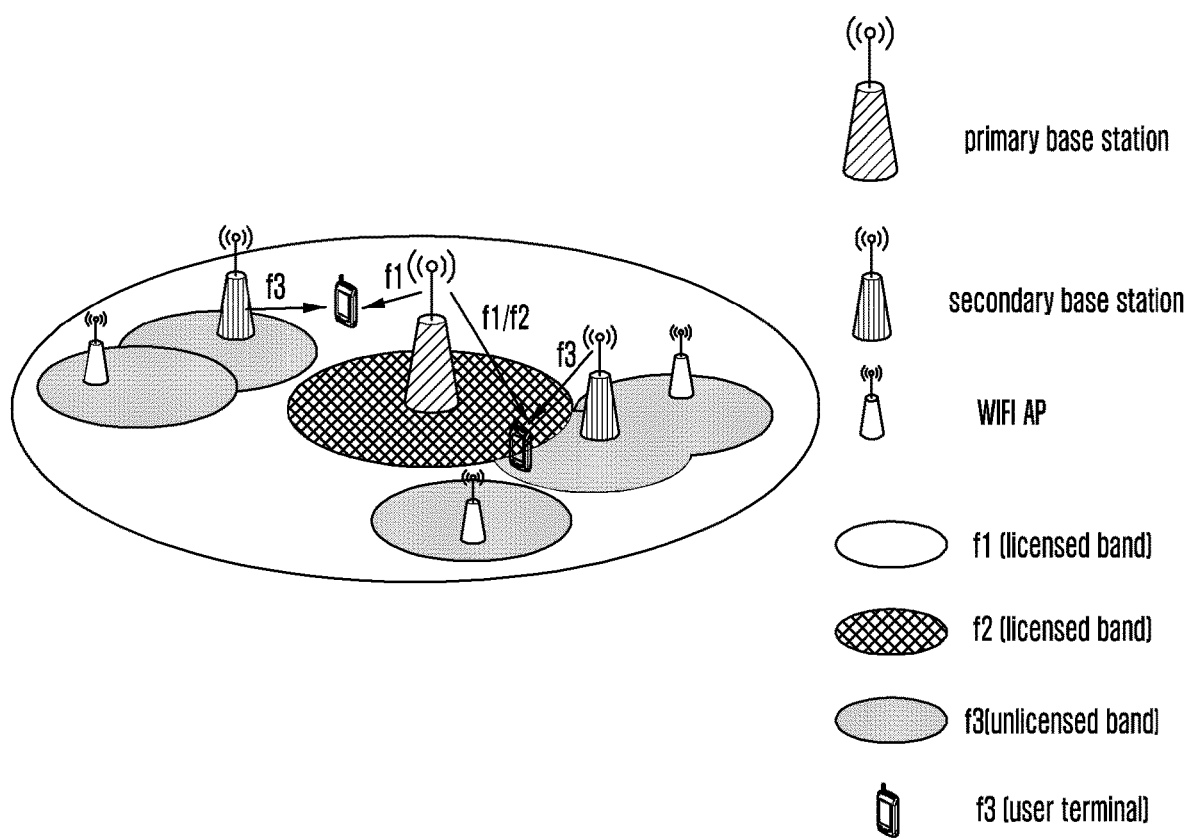
FIG. 1 is an exemplary view illustrating a scene where a licensed band and a unlicensed band is networked in a Dual Connectivity manner.
Figure 2:
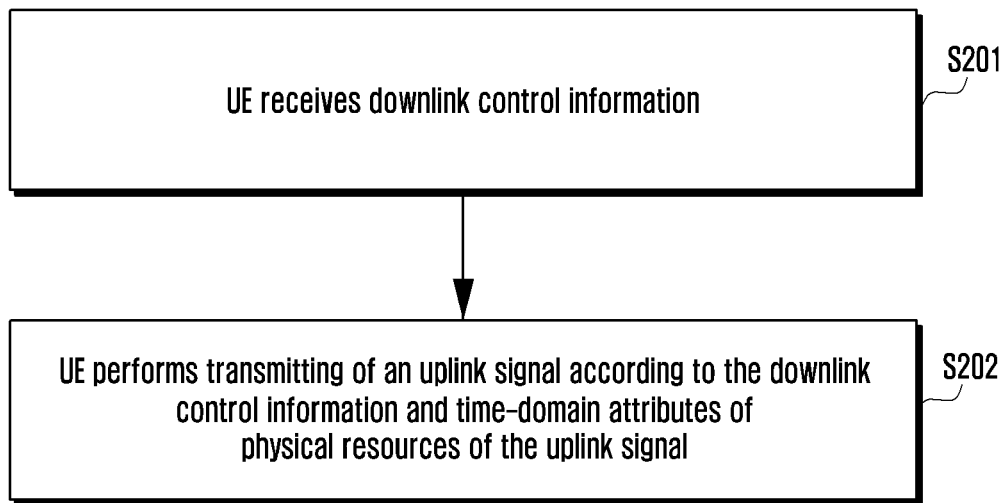
FIG. 2 is a flowchart illustrating a method for transmitting an uplink signal according to the present disclosure.

FIG. 2 illustrates an exemplary flowchart of a method for transmitting a signal according to an embodiment of the present disclosure.

At step 201, an UE receives downlink control information.

At step 202, the UE performs transmitting of an uplink signal according to the downlink control information and time-domain attributes of physical resources of the uplink signal.

The uplink signal comprises at least one of uplink signals: an uplink data channel signal PUSCH, an uplink control channel PUCCH, an uplink random access channel PRACH, an uplink sounding signal SRS.

Figure 3:
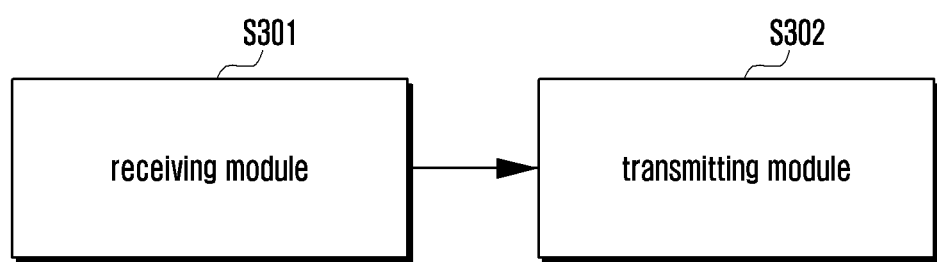
FIG. 3 is an exemplary block diagram illustrating an apparatus for transmitting the uplink signal according to the present disclosure.

FIG. 3 illustrates an exemplary block diagram of a device for transmitting the signal according to the embodiment of the present disclosure. As illustrated in FIG. 3, the device comprises a receiving module 301 and a transmitting module 302.

Wherein the receiving module 301 is configured to receive downlink control information, and the transmitting module 302 is configured to perform transmitting of an uplink signal according to the downlink control information and time-domain attributes of physical resources of the uplink signal.

Embodiment 1

As transmitting the PUSCH, the UE may transmit one or more PUSCHs once, each corresponding to different Transport Block (TB) respectively, and also may transmit K PUSCHs once, each being several repetitions for one TB.

A base station may configure repetition of the PUSCH semi-statically via a higher signaling. Wherein the base station may configure a number K of transmission times semi-statically via the higher signaling, for example, via a RRC signaling, or the base station may indicate the number K of repeating via a dynamic signaling, for example, via a downlink scheduling signaling DL assignment.

For the PUSCH transmission configured to be retransmitted K times, a step 200 (not shown) may be further included before the step 201. In the step 200, the UE is transmitting the PUSCH.

In the step 201, the downlink control information at least comprises a Hybrid Automatic Repeat Request HARQ-ACK feedback information, which is a HARQ-ACK information for the PUSCH for one or more HARQ processes of the UE carried by a special DCI by the base station. In the present disclosure, the special DCI is referred to as DFI (Downlink Feedback Information) for short. For example, one DFI comprises the HARQ-ACK information for all UL HARQ processes on one carrier or for the UL HARQ processes of all UL transmission with configured grant (GUL) for one UE. As another example, the DFI comprises the HARQ-ACK information for all UL HARQ processes on a plurality of carriers or for the UL HARQ processes of all GULs for the one UE. As still another example, the DFI comprises the HARQ-ACK information for the UL HARQ processes configured for a plurality of UEs. UE may receive the DFI on one carrier, in which the HARQ-ACK information for the UL HARQ process for the carrier is included, and the DFI may also comprise the HARQ-ACK information for the UL HARQ process for other carrier(s), for example, by indicating a bit field in the DFI to indicate the carrier for which the DFI is used.

For a PUSCH1 transmitted at timing n, the UE expects to receive the DFI comprising the HARQ-ACK information for this PUSCH1 no earlier than timing n+m_dfi. That is to say, if the UE receives a DFI before timing n+m_dfi, its HARQ-ACK information would not comprise the valid HARQ-ACK feedback for PUSCH1. Generally, m_dfi reflects a minimum processing delay required for generating a HARQ-ACK based on a received PUSCH by the base station. In an actual system, different base stations may have different processing capabilities and their minimum processing delay required may also be different. One m_dfi or a set of m_dfi is defined in a Standard, such that all base stations should reach this minimum process delay, but the base station with higher capability may generate the HARQ-ACK more quickly.

For example, assuming that the DFI comprises HARQ-ACK feedbacks for 16 HARQ processes, the UE transmits the PUSCH 1 at timing n, corresponding to the HARQ process #3, the UE considers the HARQ-ACK for the HARQ process #3 in the DFI received before timing n+m_dfi as being invalid HARQ-ACK for the PUSCH1 and may not determine whether the base station receives the PUSCH1 correctly based on the feedback information. As another example, UE transmits the PUSCH1 at timing n, corresponding to HARQ process #3, and the UE receives the DFI at timing m, wherein m satisfies m−n≥m_dfi. Also, the UE receives no HARQ-ACK for the PUSCH1 feedback from the base station before timing m. Then, the UE may consider the HARQ-ACK for the HARQ process #3 in the DFI received at timing m is the valid HARQ-ACK for the PUSCH1, and determine whether the base station receives the PUSCH1 correctly based on the feedback information. Preferably, the base station configures a m_dfi value for the UE, or the base station configures a set of m_dfi values applicable to different PUSCH transmission conditions for the UE. For example, the base station configures a set of m_dfi values applicable to PUSCH mapping type A and PUSCH mapping type B respectively, and/or applicable to different ending positions of PUSCH respectively, and/or applicable to whether several sets of discontinuous Demodulation Reference Signals (DMRSs) exist. For example, the base station configures 2 m_dfi values applicable to a case where only one set of DMRSs exist or a case where several sets of DMRSs exist respectively. The set of DMRSs occupy one or more continuous time-domain symbols. The several sets of DMRSs are spaced in time.

In step 202, the performing transmitting of the uplink signal comprises terminating transmitting of the PUSCH, or continuing the transmitting of the PUSCH, or retransmitting of the PUSCH.

Particularly, in the step 202, for the GUL PUSCH transmission repeated for K times, if the UE receives the DFI at timing m, in which a HARQ-ACK for a certain HARQ process is ACK, and the PUSCH of the GUL transmission for this HARQ process has been transmitted at least $K\_a$ times before timing m−m_dfi, wherein $K\_a<K$, then the UE may terminate transmitting remaining repeated PUSCH transmission. Preferably, $K\_a=1$, that is, as long as the UE transmits the PUSCH at least once before timing m−m_dfi and the received HARQ-ACK corresponding to the PUSCH is ACK, the UE may consider this HARQ-ACK as being valid, indicating that the base station has received the PUSCH correctly, and the UE terminates transmitting remaining k−k_t times PUSCH, wherein K_t is a number of times for retransmitted PUSCHs until the UE receives the DFI. If the UE receives the DFI at timing m, in which the HARQ-ACK for the certain HARQ process is NACK, and the UE is transmitting the GUL PUSCH corresponding to the HARQ process at timing m while K times retransmissions have not been completed, the UE may continue to retransmit the PUSCH until the number of retransmission times reaches K or the valid ACK is received. If the UE completes the K time retransmission at timing n, receives the DFI no earlier than timing n+m_dfi, and the HARQ-ACK of the GUL PUSCH is NACK, the UE may try to retransmit the GUL PUSCH on configured GUL resources. If the UE receives the DFI at timing m, in which the HARQ-ACK for the certain HARQ process is NACK, and the UE has completed the K time retransmission of the GUL PUSCH corresponding to this HARQ process at timing m, the UE may try to retransmit the GUL PUSCH on the configured GUL resources.

Figure 4:
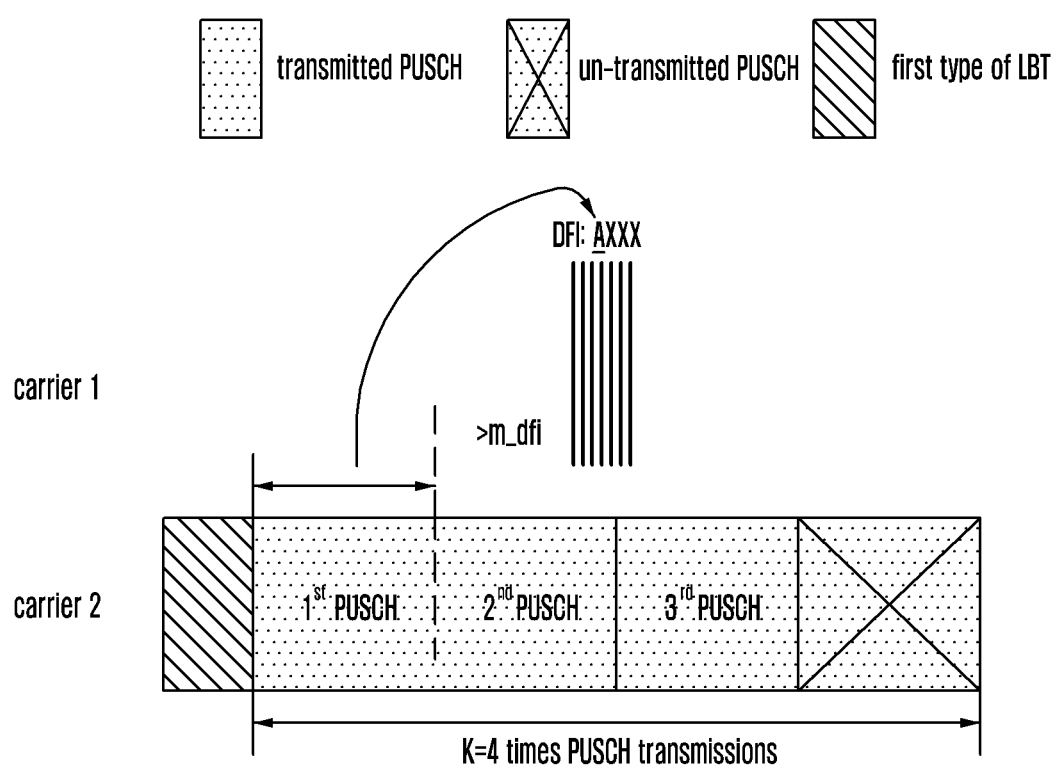
FIG. 4 is an exemplary view illustration for determining a transmitting process manner of an uplink data channel signal according to a first exemplary embodiment of the present disclosure.

As illustrated in FIG. 4, K=4, K_a=1, K_t=3, m_dfi=10 symbols. The DFI comprises HARQ-ACK information for 4 HARQ processes, the HARQ-ACK information may be ACK or NACK, wherein the PUSCH for the first HARQ process is illustrated and the HARQ-ACK information for the first HARQ process is ACK, while HARQ-ACK information for the remaining three HARQ processes is independent of this embodiment and so is expressed as X, therefore the DFI is shown as AXXX in FIG. 4. It can be seen that, when the UE receives a DFI indicating HARQ-ACK information for a carrier 2 on a carrier 1, one PUSCH has been transmitted on the carrier 2 completely in a previous slot. Because the corresponding HARQ-ACK information is ACK, the UE may terminate transmitting the PUSCHs being not transmitted after acquiring the ACK information by demodulating the DFI, for example, not transmitting the fourth PUSCH.

Figure 5:
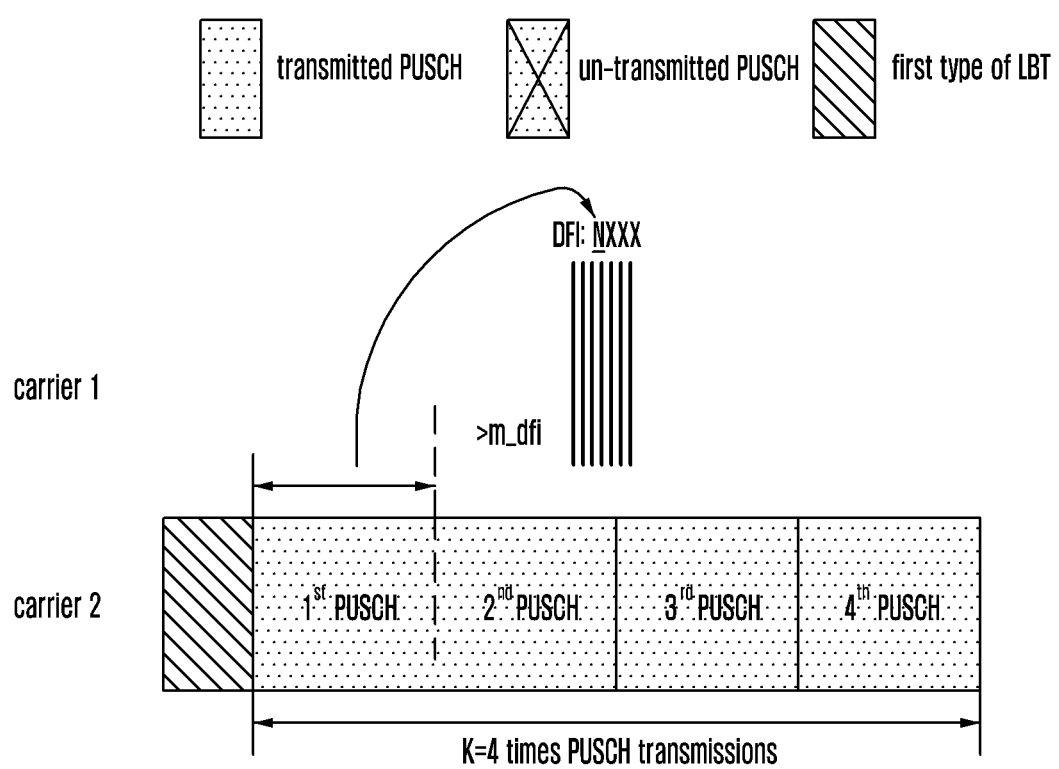
FIG. 5 is another exemplary view illustration for determining the transmitting process manner of the uplink data channel signal according to a first exemplary embodiment of the present disclosure.

As illustrated in FIG. 5, K=4, K_a=1, K_t=3, m_dfi=10 symbols. The DFI comprises HARQ-ACK information for 4 HARQ processes, wherein the PUSCH for the first HARQ process is illustrated while HARQ-ACK information for the remaining three HARQ processes is independent of this embodiment and so is expressed as X. It can be seen that, when the UE receives a DFI indicating HARQ-ACK information for a carrier 2 on a carrier 1, one PUSCH has been transmitted on the carrier 2 completely in a previous slot. Because the corresponding HARQ-ACK information is NACK, the UE continues to transmit the remaining PUSCHs until reaching the transmitted number is 4.

Embodiment 2

In step 201, the downlink control information at least comprises information for determining an uplink and/or a downlink and/or a flexible slot/symbol or information for indicating a Channel Occupied Time (COT)

In step 202, the performing transmitting of the uplink signal comprises determining of a start point resource for transmitting the PUSCH and performing the GUL PUSCH transmission according to the determined start point.

When the UE transmits the GUL PUSCH, if K times transmissions are required, the UE may determine according to at least one of following manners when the UE selects the start point of the GUL PUSCH transmission from the configured GUL resources.

Figure 6:
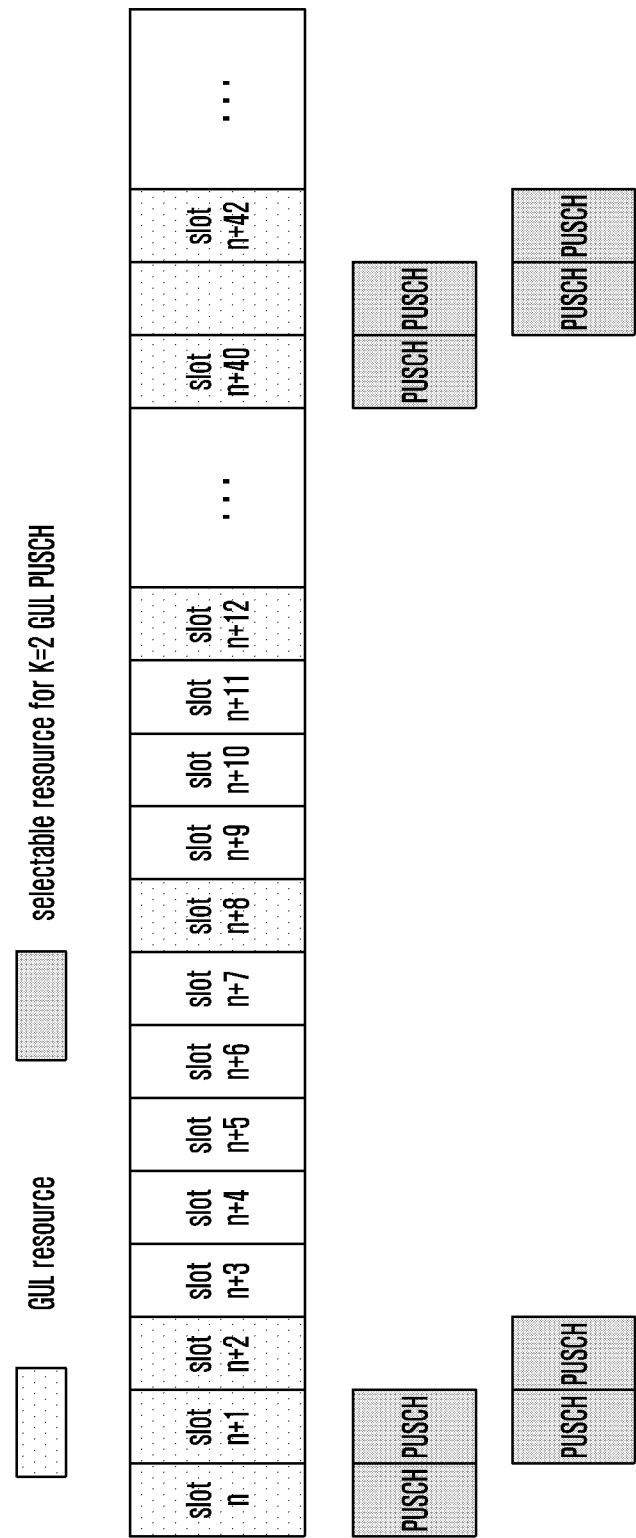
FIG. 6 is an exemplary view illustration for determining a transmitting process manner for determining of an uplink data channel signal according to a second exemplary embodiment of the present disclosure.

(2.1) When the UE selects the start point of the GUL PUSCH transmission, it may select a slot/symbol causing the GUL resources corresponding to the PUSCH to be transmitted for K times to be continuous in time as the start point. For example, as illustrated in FIG. 6, the GUL resources configured via higher signaling by the base station have a period of 40 slots, and it indicates which slots are the GUL resources among the 40 slots within the one period in a manner of bitmap. Assuming that K=2 and slots n, n+1, n+2, n+8, n+12 . . . are the GUL resources configured for the base station, the UE may select the slot n or n+1 as the start point slot for transmitting the PUSCH 2 times, but may not select the slot n+2, n+8 as the start point for transmitting the PUSCH 2 times. If the GUL resources configured semi-statically are continuous but the base station indicates to modify the GUL resource via a dynamic signaling, it may select resources satisfying the continuous resource condition according to the modified GUL resources.

(2.2) When the UE selects the start point of the GUL PUSCH transmission, it should select a slot/symbol causing the GUL resources corresponding to PUSCH retransmitted for K times to belong to a same GUL resource period as the start point. For example, the GUL resources configured via higher signaling by the base station have the period of 40 slots, and it indicates which slots are the GUL resources among the 40 slots within the one period in the manner of bitmap. It is given K=2. If the slots n, n+1, n+2, n+8, n+12 . . . are the GUL resources configured for the base station, but the slots n, n+1 belong to the first period of 40 ms, while the slots n+2, n+8, n+12 . . . belong to the second period of 40 ms. Then the UE may select the slot n as the start point slot for transmitting the PUSCH 2 times, but may not select the slot n+1 as the start point slot for transmitting the PUSCH 2 times.

Furthermore, when the UE selects the start point of the PUSCH transmission, it may limit that the PUSCHs transmitted for K times not only belong to the same GUL resource period, but also are mapped to the GUL resources being continuous in time. As such, the UE may select the slot n as the start point slot for transmitting the PUSCH 2 times, but may not select the slots n+1, n+2, n+8, n+12 as the start point.

Alternatively, when the UE selects the start point of the PUSCH transmission, it may limit that the K PUSCHs belong to the same GUL resource period, but may be mapped to the GUL resources being discontinuous in time. As such, the UE may select the slots n, n+2, n+8 and n+12 as the start point slot for transmitting the PUSCH 2 times.

Figure 7:
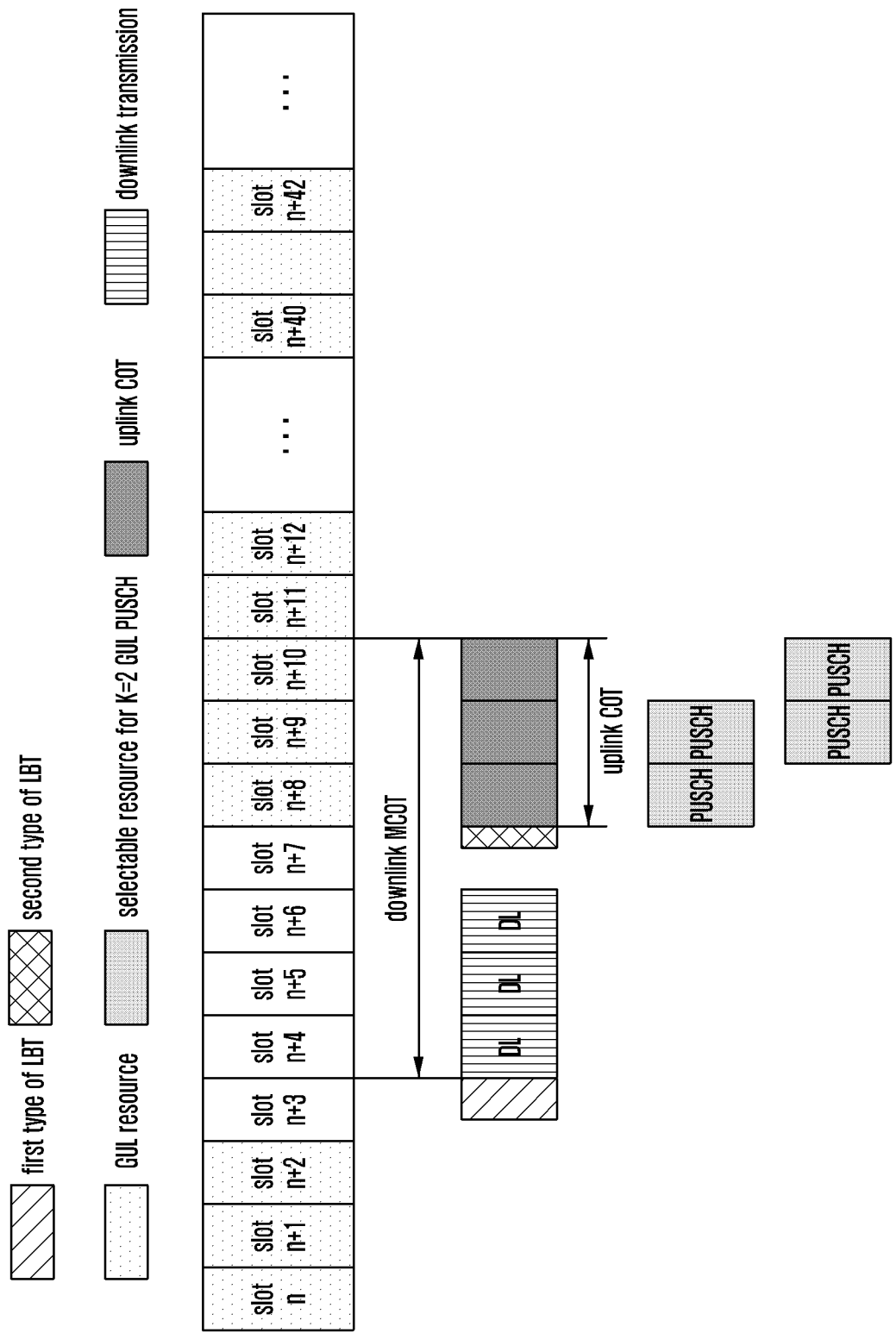
FIG. 7 is another exemplary view illustration for determining the transmitting process manner for determining of an uplink data channel signal according to a first exemplary embodiment of the present disclosure.

(2.3) When the UE selects the start point of the GUL PUSCH transmission, it may select a slot/symbol causing the GUL resources corresponding to the PUSCH retransmitted for K times to belong to a same COT as the start point. When the UE selects the start point for transmitting the GUL PUSCH, if transmitting of the PUSCH K times at the slot/symbol n would results in a part of the PUSCH transmission to be outside of one Channel Occupancy Time (COT), the UE can not select to transmit the PUSCH K times at the slot/symbol n, and instead, may select a slot/symbol m ensuring all of the K times transmission to be within one COT so as to start to transmit the K times PUSCH transmission. For example, K=2. As illustrated in FIG. 7, after completing the first type of LBT (for example, the first type of LBT defined in TS 37.213), the base station occupies the channel starting from the slot n+4, and indicates that the COT available to the uplink is the slots n+8, n+9, n+10. Then, the UE may not select the slot n+10 to start to transmit the PUSCH 2 times, and only may select the slot n+8 or the slot n+9 to start to transmit the PUSCH 2 times.

Embodiment 3

In the step 201, the downlink control information at least comprises information for determining the uplink and/or the downlink and/or the flexible slot/symbol or information for indicating the Channel Occupied Time (COT).

In the step 202, performing the transmitting of the uplink signal comprises determining a number of times for transmitting the PUSCHs and performing the GUL PUSCH transmission according to the determined number of times.

When the UE transmits the GUL PUSCH, if K times transmissions are required but the GUL resources corresponding to the PUSCH retransmitted for K times do not satisfy a predetermined condition, the UE may only transmit a part of the PUSCH. Particularly, which PUSCH(s) to be transmitted may be determined according to at least one of following manners.

(3.1) if the GUL resources corresponding to the PUSCH retransmitted for K times are discontinuous in time, assuming that the continuous GUL resources are enough to transmit at most K_c times PUSCHs, the UE may only transmit the K_c times PUSCHs on the continuous GUL resources and discards the k-k_c times transmissions, wherein K_c<K. For example, the GUL resources configured via higher signaling by the base station have the period of 40 slots, and it indicates which slots are the GUL resources among the 40 slots within the one period in the manner of bitmap. Assuming that the slots n, n+1, n+2, n+8, n+12 . . . the GUL resources configured for the base station, and K=4. If the UE selects to start to transmit the PUSCH at the slot n, the UE transmits the PUSCH for 3 times only at the slot n, the slot n+1 and the slot n+2, K_c=3 and then discards transmitting of 4−3=1 PUSCH transmission, because the slot n+8 and the slot n+2 are not adjacent slots.

Furthermore, if K_c is smaller than a predetermined threshold value, the UE should select another start point so that K_c≥the predetermined threshold value. Preferably, the threshold value may be predetermined, or configured as the base station configures the GUL. Preferably, the threshold value may be associated with a traffic type, and/or a logic channel, and/or a Redundancy Version (RV) born on the PUSCH. For example, K=4, the GUL resources configured by the base station are the slots n, n+1, n+4, n+5, n+6, n+12 . . . and the predetermined threshold value=3. There are only 2 continuous slots if starting from the slot n, which only can transmit K_c=2 PUSCHs, being smaller than the predetermined threshold value, and there are 3 continuous slots if starting from the slot n+4, K_c=3, being equal to the predetermined threshold value, therefore the UE can not select the slot n to start and only can select the slot n+4 to start, transmit the PUSCHs for 3 times and discard the transmitting of the last PUSCH.

(3.2) If the GUL resources corresponding to the PUSCH retransmitted for K times span the GUL resource configuration periods, assuming that the GUL resources within one period of the spanned GUL resource configuration periods is enough to transmit at most K_c times PUSCHs, then the UE only transmits the K_c times PUSCHs on the resources within this period, and discards the K−K_c times transmissions, wherein K_c<K. For example, the GUL resources configured via higher signaling by the base station have the period of 40 slots, and it indicates which slots are the GUL resources among the 40 slots within the one period in the manner of bitmap. Assuming that the UE selects to start to transmit the PUSCH at the slot n, K=4, K_c=2, the slots n, n+1 are the GUL resources within one period and the slot n+2 is the GUL resource in the next period. Then, the UE transmits the PUSCHs 2 times only on the slot n and the slot n+1. In one period, it may limit that the repeated PUSCHs can be transmitted only on the GUL resources being continuous in time, or be transmitted on the GUL resources being continuous in logic in the one period while the time resources occupied by the GUL resources actually may be discontinuous.

Furthermore, if K_c is smaller than the predetermined threshold value, the UE may select another start point so that K_c≥the predetermined threshold value. Preferably, the threshold value may be predetermined, or configured as the base station configures the GUL. Preferably, the threshold value may be associated with a traffic type, and/or a logic channel, born on the PUSCH and/or a Redundancy Version (RV) of the PUSCH.

Figure 8:
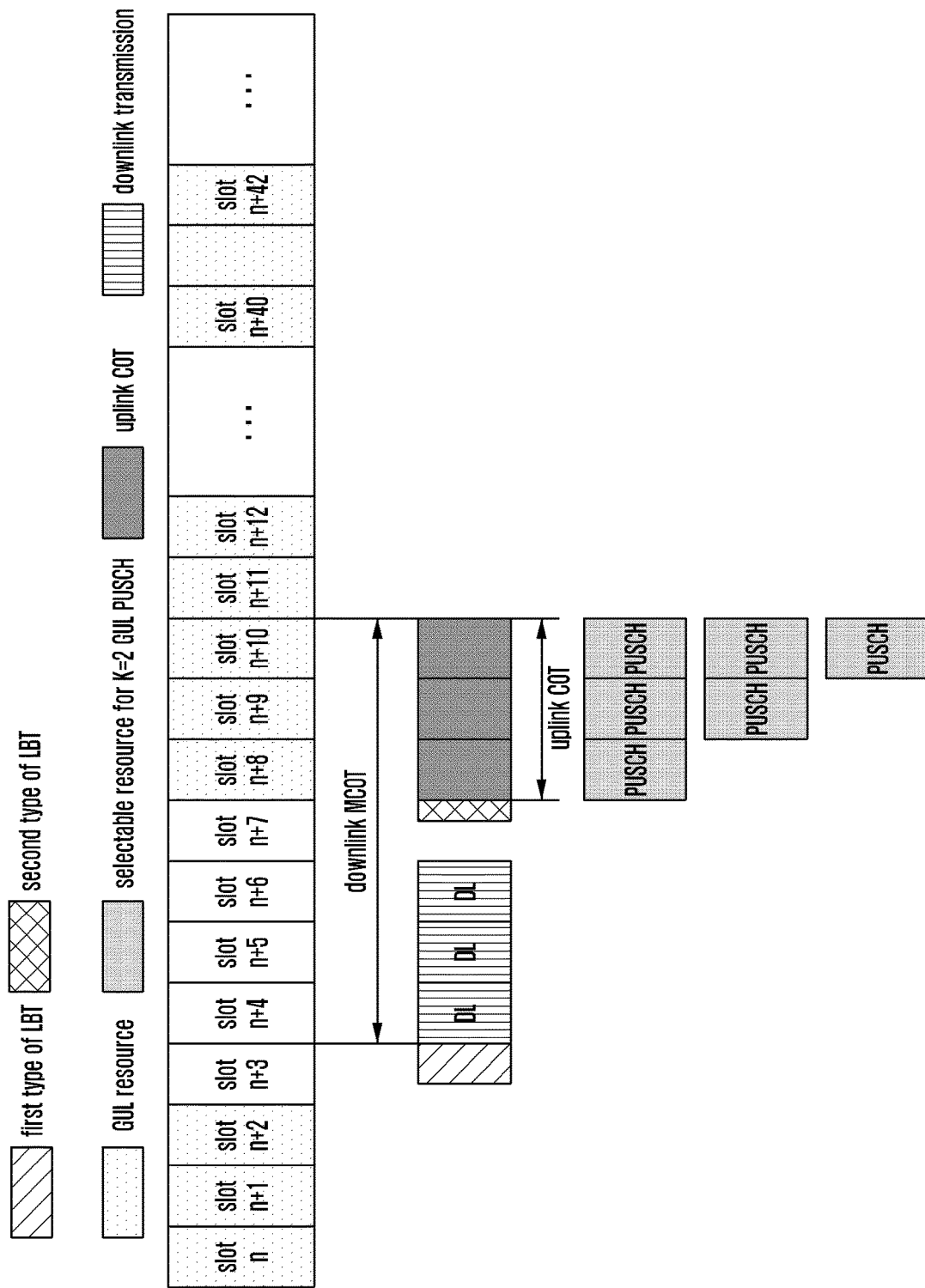
FIG. 8 is an exemplary view illustration for determining a transmitting process manner for determining of an uplink data channel signal according to a third exemplary embodiment of the present disclosure.

(3.3) If the part of resources corresponding to the K times PUSCH transmissions is outside the one COT, assuming that the resources in the same one COT is enough to transmit PUSCHs at most K_c times, the UE may transmit the PUSCHs K_c times on the resources in the same one COT and discard the K−K_c transmissions, wherein K_c<K. For example, K=4. As illustrated in FIG. 8, after completing the first type of LBT (for example, the first type of LBT defined in TS 37.213), the base station occupies the channel starting from the slot n+4, and indicates that the COT available to the uplink is the slots n+8, n+9, n+10. Then, the UE may only transmit PUSCHs at most 3 times if the UE selects to transmit the PUSCH starting from the slot n+8, or the UE may only transmit PUSCHs at most 2 times if the UE selects to transmit the PUSCH starting from the slot n+9, or the UE may only transmit PUSCH at most 1 time if the UE selects to transmit the PUSCH starting from the slot n+10.

Furthermore, if K_c is smaller than the predetermined threshold value, the UE may select another start point so that K_c≥the predetermined threshold value. For example, given the predetermined threshold value is 2, in the example shown in FIG. 8, the UE only can select to transmit PUSCHs 3 times starting from the slot n+8 or transmit PUSCHs 2 times starting from the slot n+9. Preferably, the threshold value may be predetermined, or configured as the base station configures the GUL. Preferably, the threshold value may be associated with a traffic type, and/or a logic channel, and/or a Redundancy Version (RV) born on the PUSCH.

(3.4) if the part of resources corresponding to the K times PUSCH transmissions is outside one COT, the UE may perform the first type of LBT and then transmit PUSCH transmissions K_d times, wherein K_d is not more than K and causes the K_d times PUSCH transmissions to not exceed a length of COT newly acquired by the UE through the first type of LBT. Generally, K_d=K.

(3.5) if the part of resources corresponding to the K times PUSCH transmissions is outside one COT, the UE may determine whether the K times PUSCH transmissions is terminated or may be continued at the end of the COT according to an indication from the base station.

Embodiment 4

In the step 201, the downlink control information at least comprises the HARQ-ACK information.

In the step 202, performing the transmitting of the uplink data channel signal comprises determining the CWS of a channel access procedure before transmitting the uplink signal, and transmitting the uplink signal after completing the LBT according to the CWS.

Similar to the processing for the HARQ-ACK in Embodiment 1, for the one PUSCH1 transmitted at timing n, the UE expects to receive the DFI comprising the HARQ-ACK information for the PUSCH1 no earlier than timing n+m_dfi. That is to say, if the UE receives a DFI before timing n+m_dfi, its HARQ-ACK information would not comprise the valid HARQ-ACK feedback for the PUSCH1. Then, the HARQ-ACK information available for adjusting of the CWS must satisfy: a time difference between the timing m at which the UE receives the HARQ-ACK information and the timing n at which the UE transmits the PUSCH corresponding to the HARQ-ACK information is not smaller than m_dfi_0. Preferably, assuming that the UE receives the DFI at timing m, UE had transmitted the PUSCH no later than timing m−m_dfi_0, this PUSCH is nearest to timing m−m_dfi_0 in time, the base station has not transmitted the HARQ-ACK information for the PUSCH before timing m and the UE has not adjusted the CWS based on the HARQ-ACK for the PUSCH, then the HARQ-ACK information corresponding to the PUSCH in the DFI may be used to determine the adjusting of the CWS. Preferably, the m_dfi_0 is identical with m_dfi in Embodiment 1. Preferably, m_dfi_0 is in the unit of a slot or an OFDM symbol.

Preferably, the PUSCH is the first PUSCH in last uplink transmissions satisfying that the time difference≥m_dfi_0, or the PUSCH is all PUSCHs satisfying the time difference during a first slot in the last uplink transmission satisfying the time difference≥m_dfi_0, or the PUSCH is a PUSCH satisfying the time difference and being earliest in time during the first slot in the last uplink transmission satisfying the time difference≥m_dfi_0.

For example, the first slot comprises PUSCH1, PUSCH2 and PUSCH3 which are time division multiplexed. Assuming that a time interval from the ending position of the PUSCH3 to slot m is smaller than m_dfi_0, time intervals from ending positions of the PUSCH1 and PUSCH2 to slot m is greater than or equal to m_dfi_0, then the HARQ-ACKs for the PUSCH1 and PUSCH2 may be used for the adjusting of the CWS.

Figure 9:
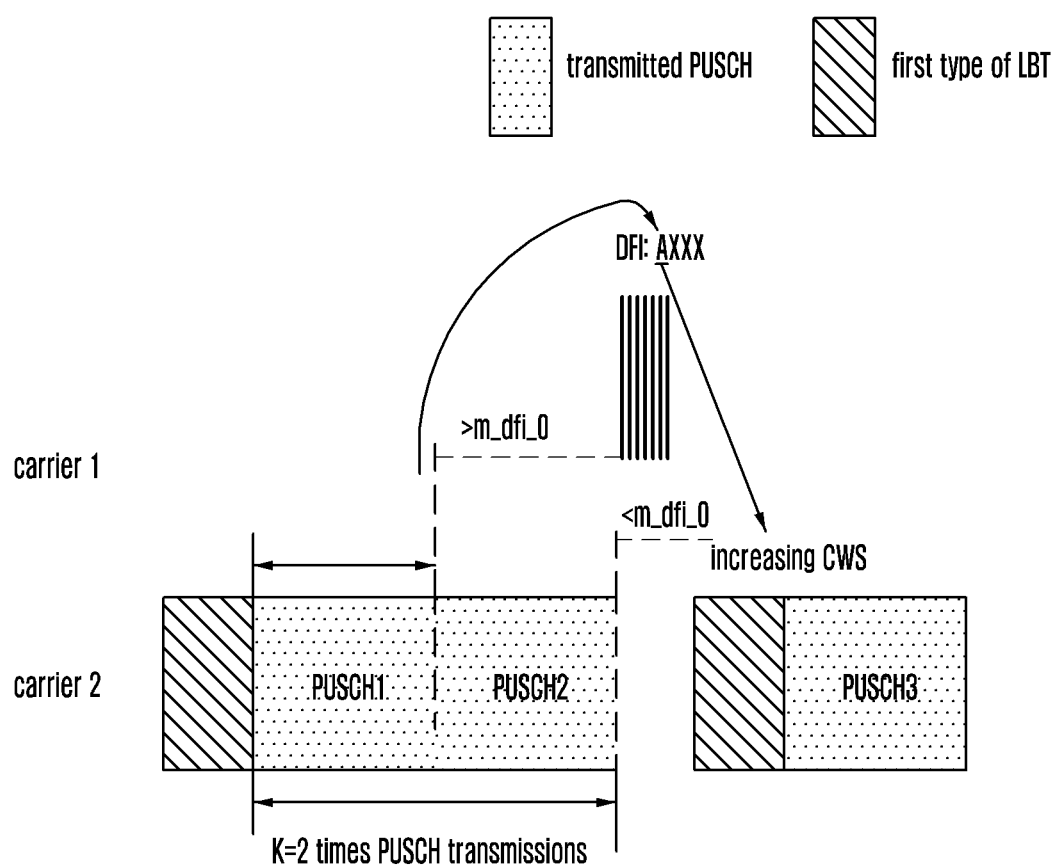
FIG. 9 is an exemplary view illustration for determining a transmitting process manner for determining of an uplink data channel signal according to a fourth exemplary embodiment of the present disclosure.

If the base station configures K times transmissions for PUSCH, for example, the base station configures the K times transmissions as configuring the GUL transmission, if at timing m the UE receives a DFI in which a HARQ-ACK for a certain HARQ process is ACK, and the PUSCH of this HARQ process has been transmitted for at least K_a times before timing m−m_dif_0, wherein K_a<K, the UE may consider that this HARQ-ACK can be used for the adjusting of the CWS. Preferably, K_a=1, that is, the UE transmits the PUSCH at least once before timing m−m_dif_0, and the HARQ-ACK corresponding to PUSCH in the DFI received by the UE at timing m is ACK, the UE may adjust the CWS by using the HARQ-ACK. The UE adjusts the CWS only once by using the HARQ-ACK. As illustrated in FIG. 9, K=2, K_a=1, m_dfi=10 symbols. The DFI comprises HARQ-ACK information for 4 HARQ processes, the HARQ-ACK information may be ACK or NACK, wherein the PUSCH for the first HARQ process is illustrated and the HARQ-ACK information for the first HARQ process is ACK, while HARQ-ACK information for the remaining three HARQ processes is independent of this embodiment and so is expressed as X, therefore the DFI is shown as AXXX in the Figure. It can be seen that, when the UE receives a DFI indicating HARQ-ACK information for a carrier 2 on a carrier 1, one PUSCH has been transmitted on the carrier 2 completely in a previous slot. Because the corresponding HARQ-ACK information is ACK, the UE may reset the CWS of next uplink transmission burst (PUSCH3) according to the ACK.

Figure 10:
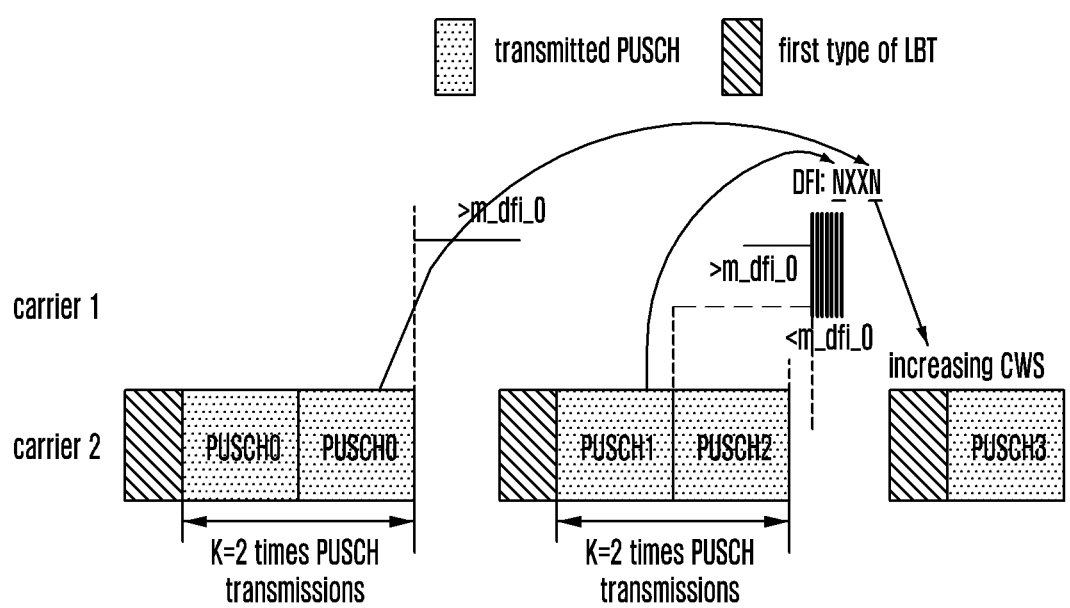
FIG. 10 is another exemplary view illustration for determining the transmitting process manner for determining of an uplink data channel signal according to the fourth exemplary embodiment of the present disclosure.

If the base station configures K times transmissions for PUSCH, for example, the base station configures the K times transmissions as configuring the GUL transmission, if at timing m the UE receives a DFI in which a HARQ-ACK for a certain HARQ process is NACK, and a number of transmission times of the PUSCH of this HARQ process is smaller than K_b before timing m−m_dif_0, the UE may consider that this HARQ-ACK is not used for the adjusting of the CWS. Preferably, K_b=K. Preferably, K_b is a number of times of continuous retransmission, K_b<K, for example, K=4, and in this transmission, it may transmit continuously only 2 times because of the limitation of the length of COT, then K_b=2. If the number of transmission times of the PUSCH of the HARQ process≥K_b before timing m−m_dif_0, the UE may consider that the HARQ-ACK can be used for the adjusting of the CWS. As illustrated in FIG. 10, K=2, K_b=1, m_dfi=10 symbols. The DFI comprises HARQ-ACK information for 4 HARQ processes, the HARQ-ACK information may be ACK or NACK, wherein the PUSCHs for the first and fourth HARQ processes are illustrated and the HARQ-ACK information for the first and fourth HARQ processes is NACK, while HARQ-ACK information for the remaining two HARQ processes is independent of this embodiment and so is expressed as X, therefore the DFI is shown as NXXN in the Figure. It can be seen that, when the UE receives a DFI indicating HARQ-ACK information for the carrier 2 on the carrier 1, only one PUSCH has been transmitted on the carrier 2 completely in a previous slot. Because the corresponding HARQ-ACK information is NACK, the UE may look for another uplink transmission burst (PUSCH0 2 times) forward, instead of adjusting the CWS of the next uplink transmission burst (PUSCH3) according to this NACK, and because the HARQ-ACK indicating the PUSCH0 in the DFI is NACK and the UE has not used this NACK to adjust the CWS, the UE may increase the CWS of the PUSCH3 according to this NACK.

UE performs the channel access according to the first type of LBT before the uplink transmission for the PUSCH corresponding to the HARQ-ACK available for adjusting the CWS begins.

In the step 202, the CWS is adjusted according to the HARQ-ACK determined to be available for the adjusting of the CWS based on method described above. For all HARQ-ACKs available for the adjusting of the CWS, if a percentage of the ACK exceeds a predetermined threshold value, or a percentage of the NACK is below a predetermined threshold value, the CWS is reset, otherwise the CWS is increased to a greater available value.

Embodiment 5

In the step 201, the downlink control information comprises information for determining an uplink and/or a downlink and/or a flexible slot/symbol or information for indicating a Channel Occupied Time (COT).

In the step 202, determining the transmitting of the uplink signal comprises determining transmitting or discarding the uplink signal.

The base station may semi-statically configure the uplink slot/symbol, the downlink slot/symbol and the flexible slot/symbol via higher signaling. If these information are not configured by the base station via the higher signaling, these resources may be considered as being configured semi-statically as the flexible slot/symbols for future processing. The base station further indicates the uplink slot/symbol, the downlink slot/symbol and the flexible slot/symbol via a dynamic signaling, such as a Slot Format Indication (SFI). Generally, the downlink slot/symbol indicated semi-statically may not be indicated as the uplink or flexible slot/symbol via the dynamic signaling, the uplink slot/symbol indicated semi-statically may not be indicated as the downlink or flexible slot/symbol via the dynamic signaling, but the flexible slot/symbol indicated semi-statically may be indicated as the uplink or downlink or flexible slot/symbol via the dynamic signaling.

The base station may transmit an indication for indicating the uplink/downlink/flexible slot/symbol via the dynamic signaling periodically. The UE may try to receive the indication on the corresponding resources. For example, the base station configures a period, an offset of the SFI. A length of time of the information on the uplink/downlink/flexible slot/symbol indicated in the SFI is greater than or equal to the period of the SFI generally. For example, the base station expects to transmit the SFIs at the slots n, n+10, n+20 . . . , and the uplink/downlink/flexible slot/symbol indicated in the SFI transmitted in the slot n is applicable to a slot with a length of L_sfi, starting from the slot n. L_sfi≥10 slots. If several SFIs indicate the uplink/downlink/flexible slot/symbol information belonging to the same resource, the information indicated by these SFIs should be identical, or is determined according to an indication of the SFI last received.

The base station also may transmit the dynamic signaling to indicate the uplink/downlink/flexible slot/symbol when one downlink transmission burst starts. For example, the base station may indicate information on a downlink COT, such as the length, the start point of the COT, etc., and which slot/symbol(s) is uplink or downlink in the COT, and the like.

In following descriptions, unless specifically indicated, a detailed format for indicating the uplink/downlink/flexible slot/symbol would not be defined, and the detailed format of the dynamic signaling may be one of the signaling formats described above or combination thereof. For a purpose of convenience for description, the SFI is described as an example.

Because the LBT is generally performed when the signal is transmitted on the unlicensed band, the base station fails to transmit the SFI if the LBT before the base station transmits the dynamic signaling indication (referred to as SFI thereafter, but the dynamic signaling indication is not limited to the SFI) SFI indicating the uplink/downlink/flexible slot/symbol. Alternatively, the base station succeeds in completing the LBT and transmits the SFI, but the UE is interfered as receiving the SFI due to other hided terminals. In the prior art, for the uplink signal configured semi-statically, for example, the GUL transmission, a spontaneous PRACH transmission of UE, the PUCCH transmitted periodically and the SRS transmitted periodically, transmitting of these signals would be cancelled if the UE fails to receive the SFI. On the unlicensed band, such action would result in reduced transmission efficiency. In order to improve the transmission efficiency, the uplink signal configured semi-statically may be transmitted in at least one of following manners.

(5.1) If the UE is configured with the GUL transmission resource and the selected GUL transmission resource for a certain GUL PUSCH transmission is the uplink and/or flexible slot/symbol configured semi-statically, the UE may try to transmit the PUSCH if the UE receives no dynamic signaling indication indicating that a part or all of resources of the PUSCH are the downlink slot/symbols. For example, if the UE receives no SFI indication, or the UE receives the SFI indication indicating that a part or all of the resources of the PUSCH are the uplink and/or flexible slot/symbols, the UE may try to transmit the PUSCH. If the UE receives the dynamic signaling indication indicating that a part or all of the resources of the PUSCH are the downlink slot/symbols, for example, the SFI indication, or other DCI indication, such as an indication scheduling the resources to receive the PDSCH/CSI-RS or an indication of a downlink transmission burst resource, the UE may not transmit the PUSCH.

Preferably, the UE may try to transmit the PUSCH if the GUL PUSCH comprises the uplink control information, for example, the HARQ-ACK, if the resources for the PUSCH are the uplink and/or flexible slot/symbols configured semi-statically, and the UE receives no dynamic signaling indication indicating that a part or all of the resources of the PUSCH are the downlink slot/symbols. Regarding the GUL PUSCH comprising only data, the UE may not transmit the PUSCH, if the resources for the PUSCH are the flexible slot/symbols configured semi-statically, and the UE receives no dynamic signaling indication or the dynamic signaling indication indicates the flexible slot/symbol.

(5.2) If the UE is configured with the GUL transmission resource and the selected GUL transmission resource for a certain GUL PUSCH transmission is the uplink and/or flexible slot/symbol configured semi-statically, the UE may try to transmit the PUSCH if the UE receives no dynamic signaling indication indicating that a part or all of resources of the PUSCH are the downlink and flexible slot/symbols, otherwise the PUSCH is not transmitted. For example, if the UE detects no SFI and receives no other DCI for determining that the resource is the downlink resource, the UE may try to transmit the PUSCH. As another example, the UE receives the SFI indicating that the resources are the flexible slot/symbols, the UE may not try to transmit the PUSCH.

Preferably, the UE may try to transmit the PUSCH if the GUL PUSCH comprises the uplink control information, for example, the HARQ-ACK, if the resources for the PUSCH are the uplink and/or flexible slot/symbols configured semi-statically, and the UE receives no dynamic signaling indication indicating that a part or all of the resources of the PUSCH are the downlink and/or flexible slot/symbols. Regarding the GUL PUSCH comprising only data, the UE may not transmit the PUSCH, if the resources for the PUSCH are the flexible slot/symbols configured semi-statically, and the UE receives no dynamic signaling indication or receives the dynamic signaling indication indicates the flexible slot/symbol.

Preferably, based on the methods in (5.1) and (5.2), when the base station configures the GUL transmission, it may configure whether the UE tries to the GUL transmission on the GUL resources on which no dynamic signaling indication indicating the downlink slot/symbol is received. For example, if the UE receives no dynamic signaling indication indicating that a part or all of the resources of the PUSCH are the downlink slot/symbols, the base station may configures the UE to try to transmit the GUL transmission on the configured GUL resources; if the GUL transmission resources are not uplink resources configured semi-statically and the UE receives no dynamic signaling indication indicating that the resources are the uplink slot/symbols, the base station may also configure the UE not to try to transmit the GUL transmission on the configured GUL resources.

Preferably, based on the methods in (5.1) and (5.2), when the base station configures the GUL transmission for the UE, it may configure whether the UE tries to the GUL transmission on the GUL resources on which no dynamic signaling indication indicating the downlink and/or flexible slot/symbol is received.

Preferably, based on the methods in (5.1) and (5.2), when the base station configures the GUL transmission, it may configure whether the UE tries to the GUL transmission on the GUL resources on which no dynamic signaling indication indicating the downlink slot/symbol is received, or may configure whether the UE tries to the GUL transmission on the GUL resources on which no dynamic signaling indication indicating the downlink and/or flexible slot/symbol is received.

For example, for different traffics, the base station may configure a plurality of GUL transmissions for the UE.

For a time sensitive traffic, such as a Ultra Reliable and Low Latency Communication (URLLC), in order to ensure that such traffic can be transmitted in time, when the base station configures the GUL transmission bearing such traffic, for a case where the UE receives no dynamic signaling indication indicating that a part or all of the resources of the PUSCH are the downlink slot/symbols, the base station may configure the UE to try to transmit on the GUL resources; and for other cases, the base station may configure the UE not to try to transmit on the GUL resources.

Further, for the GUL transmission bearing an enhanced Mobile Broad Band (eMBB) traffic, when the base station configures the GUL transmission bearing such traffic, for a case where the UE receives a dynamic or a semi-static signaling indication indicating that all of the resources of the PUSCH are the uplink slot/symbols, the base station may configure the UE to try to transmit on the GUL resources; and for other cases, the base station may configure the UE not to try to transmit on the GUL resources.

Preferably, the base station may indicate that whether the UE may perform the GUL transmission on special resources via other signaling. For example, similar to bits for indicating whether the UE is permitted to transmit the GUL transmission within a Maximum Channel Occupancy Time (MCOT) in a Common Downlink Control Channel C-PDCCH in TS 36.213, the base station may indicate whether the UE is permitted to transmit the GUL transmission in the COT, in the SFI or other DCIs for indicating the COT signaling. Such type of indications may be combined with rules determining whether to transmit the GUL transmission as described above in (5.1) and (5.2).

(5.3) If the UE is configured with the GUL transmission resource and the selected GUL transmission resource for a certain GUL PUSCH transmission is the uplink and/or flexible slot/symbol configured semi-statically, and a part or all of the PUSCH resources are located between two adjacent SFI indications, and the UE receives no dynamic signaling indication indicating that a part or all of the resources of the PUSCH are the uplink/downlink/flexible slot/symbols, then, the UE may tries to transmit the PUSCH on the resources for the PUSCH before a SFI slot possibly received just next time; if the SFI is received at the SFI slot, the UE may determines whether the transmitting of the PUSCH is continued or terminated according to the SFI indication.

For example, the slots expected to transmit the SFIs are n, n+4, n+8 . . . , the GUL transmission PUSCH resources start from the slot n+2, K=4. If the UE does not receive uplink/downlink/flexible slot information on SFI indication slots n+2, n+3 in the slot n, the UE may try to transmit the PUSCH in the slot n+2 until the slot n+3, but the UE needs to try to receive the SFI in the slot n+4.

Preferable, if indications DL MCOT and the SFI are separate dynamic signaling, and if UE receives no SFI but receives the DL MCOT signaling indicating the part or all of the resources of the PUSCH are the downlink, the UE can not transmit the PUSCH.

(5.4) The PRACH spontaneously transmitted by the UE may be also determined according to the methods described in (5.1)~(5.3) above. Preferably, for different types of PRACH transmissions, UE may determine whether to try to transmit the PRACH on the downlink slot/symbols, or the downlink and/or flexible slot/symbols indicated dynamically according to predetermined rules. For example, the first type of PRACH transmission is the PRACH transmission on a Pcell or a Scell, and the second type of PRACH transmission is the PRACH transmission on the Scell. As another example, if resources utilized by the PRACH is resources configured in RACH-ConfigCommon, it belongs to the first type of PRACH transmission, otherwise is the second type of PRACH transmission.

As a further example, the first type of PRACH transmission is the PRACH accessed initially or the PRACH for handover, and other PRACHs are the second type of PRACH. Alternatively, the PRACH based on non-contention belongs to the first type of PRACH transmission, while the PRACH based on contention belongs to the second type of PRACH transmission.

For example, the UE may try to whether to transmit on the configured PRACH resources for the first type of PRACH transmission. The UE may transmit the PRACH on the resources if the UE receives no indication indicating that the resources are the downlink transmission resources, otherwise the PRACH would not be transmitted.

The UE may try to whether to transmit on the configured PRACH resources for the second type of PRACH transmission. The UE may try to transmit the PRACH on the resources if the UE receives no indication indicating that the resources are the downlink and/or flexible slots/symbols, otherwise the PRACH would not be transmitted.

The PRACH triggered based on the dynamic signaling may be tried to transmit on the resources indicated by the dynamic signaling without referring to a signaling indicating the uplink/downlink and/or flexible slot/symbol dynamically. Or, the PRACH triggered based on the dynamic signaling may be tried to transmit on the first resource indicated by the dynamic signaling without referring to the uplink/downlink and/or flexible slot/symbol dynamically, and is processed as the first type of PRACH on subsequent resources.

(5.5) The special type of PUCCH may be also determined according to the methods described in (5.1)~(5.3) above. For example, if the PUCCH expected to be transmitted by the UE comprises a Scheduling Request (SR) and UE receives no SFI indicating resources for the PUCCH, the UE may try to transmit the PUCCH. As another example, if the PUCCH expected to be transmitted by the UE comprises the SR and UE receives the SFI indicating resources for the PUCCH are the flexible resources, the UE may try to transmit the PUCCH.

Preferably, the transmitting of the semi-static uplink information needs to keep away from time-frequency resources for the SFI. For example, if the SFIs are transmitted on the first OFDM symbol in the slots n, n+k0, n+2*k0, the UE can not try to transmit the semi-static uplink information on BWP or LBT subbands or carriers at which the SFI is located in the first OFDM symbol in these slots.

(5.6) The special type of SRS may also be determined according to the methods described in (5.1)~(5.3) above.

Preferably, in the step 201, the downlink control information may indicate the downlink slot/symbol, the uplink slot/symbol, the flexible slot/symbol and the special flexible slot/symbol. In the special flexible slot/symbol, the UE may try to transmit the predetermined uplink signal configured semi-statically, for example, the GUL and/or PRACH. Preferably, in the special flexible slot/symbol, the UE may try to transmit the special type of PUCCH, such as the PUCCH including the SR or the PUCCH including the HARQ-ACK. Preferably, in the special flexible slot/symbol, the UE performs the first type of LBT, and the special flexible slot/symbol is not counted into the length of the downlink MCOT. Preferably, in the special flexible slot/symbol, the UE does not try to receive the predetermined downlink signal configured semi-statically, such as the PDCCH and/or a synchronous signal/Broadcast Channel (SS/PBCH), or the UE tries to receive the predetermined downlink signal configured semi-statically, such as the PDCCH and the SS/PBCH. Preferably, in the special flexible slot/symbol, if the base station indicates the downlink slot/symbol, for example, by triggering an aperiodic CSI-RS via the DCI, the UE may measure according to the CSI-RS, otherwise the UE may not measure according to the CSI-RS.

Preferably, the UE tries to receive the configured PDCCH and/or SS/PBCH in the flexible slot/symbol, but not to receive other downlink signal configured semi-statically, such as periodic CSI-RS, and not to transmit predetermined uplink signal configured semi-statically.

Preferably, the UE tries to receive the downlink signal and not to transmit the uplink signal in the downlink slot/symbol; and tries to transmit the uplink signal and not to receive the downlink signal in the uplink slot/symbol.

Preferably, the special flexible slot/symbol may be indicated via the dynamic signaling explicitly, for example, D, U, F and SF are defined to express the downlink, uplink, flexible and special flexible slot/symbol respectively. The SFI indicates respective symbols in each of the X slots belong to which states among these four states. Wherein X≥a period k0 of the SFI. Preferably, if several SFIs indicate the state of a same slot/symbol, the state of the slot/symbol is determined according to the SFI received last if this slot/symbol is the special flexible slot/symbol, and the states indicated by the several SFIs should be identical with each other if this slot/symbol is in the remaining three states.

Preferably, the special flexible slot/symbol may be indicated via the dynamic signaling implicitly, for example, if the slot X indicated by the SFI<the period k0 of the SFI, the last k0-X slots in the one period of the SFI are the special flexible slot/symbol.

Preferably, if the base station may transmit the SFI and the dynamic signaling indicating the COT information, the UE may try to transmit the uplink signal and receive the downlink signal in the uplink resources or the downlink resources indicated by the COT, in a case where the resource indicated by the COT at which a downlink transmission burst can not overlap with the uplink resource indicated by the SFI, the resource indicated by the COT available for the uplink transmission can not overlap with the downlink resource indicated by the SFI, the resource indicated by the COT at which the uplink or downlink transmission burst can overlap with the flexible resource indicated by the SFI, and the resource indicated by the COT at which the uplink or downlink transmission burst can overlap with the special flexible resource indicated by the SFI.

Preferably, in resources not indicated by the COT, if they are overlapped with the flexible resources indicated by the SFI, the UE does not try to receive the PUCCH, the periodic CSI-RS and not try to transmit the uplink signal configured semi-statically on the overlapped resources. Preferably, in the resources not indicated by the COT, if they are overlapped with the special flexible resources indicated by the SFI, the UE may try to transmit the predetermined uplink signal configured semi-statically on the overlapped resources. Preferably, in the resources not indicated by the COT, if they are overlapped with the special flexible resources indicated by the SFI, the UE may try to receive the PDCCH on the overlapped resources.

Preferably, if the UE attempts to transmit uplink on the resources not indicated by the COT, the first type of LBT, namely Cat-4 LBT is needed.

Preferably, if the UE attempts to transmit uplink on the resources indicated by the COT, the second type of LBT, for example 25 μs LBT is needed, or no LBT is performed.

Preferably, the methods described above are only used for the transmission in the unlicensed band. The transmission in the licensed band is performed according to TS 38.213.

Preferably, the methods described above are used for the transmissions in the unlicensed band and the licensed band.

The receiving of the downlink signal or transmitting of the uplink signal based on the dynamic scheduling of the base station is dynamically determined by the UE according to the scheduling signaling, without relying on the dynamic indication signaling. For receiving of the downlink signals or transmitting of the uplink signal K times, dynamically scheduled by the base station, at least the first receiving or transmitting is determined according to the scheduling signaling, without relying on the dynamic indication signaling.

Embodiment 6

In the step 201, the downlink control information comprises at least time resource information on the PUSCH.

In the step 202, determining the transmitting of the uplink signal comprises transmitting of the PUSCH and/or the DMRS of the PUSCH in a selected time resource pattern.

The time resource information on the PUSCH indicated in the downlink control information may comprises an indication information with a type A or a type B. Wherein the type A denotes that the DMRS of the PUSCH is transmitted in a third or a fourth symbol in one slot, and the type B denotes that the DMRS of the PUSCH is transmitted in a first entire symbol of the PUSCH in the one slot. Further, the start point of the PUSCH with the type A is the first symbol in the one slot, and that of the PUSCH with the type B may be any symbol in the one slot.

When the base station schedules the UE, via one DCI, to transmit on M>1 slots, or the base station configures the UE, via the higher signaling, to transmit on the M>1 slots, the PUSCH and/or a DMRS pattern of the PUSCH in the M slots may be determined according to at least one of manners as follows.

(1) According to an indication of the base station, types of the DMRSs in the M slots, which are identical with each other, are determined.

(2) According to the indication of the base station, the type of the DMRS in the first slot among the M slots and the types of the DMRSs in the remaining M−1 slots are determined respectively, the types of the DMRSs in the remaining M−1 slots are identical with each other; or, the type of the DMRS in the first slot among the M slots, the type of the DMRS in the last slot among the M slots and the types of the DMRSs in the remaining M−2 slots are determined respectively, the types of the DMRSs in the remaining M−2 slots are identical with each other; or, the type of the DMRS in the first slot among the M slots, the type of the DMRS in the last slot among the M slots and the types of the DMRSs in the remaining M−2 slots are determined respectively, the types of the DMRSs in the first and last slots are identical with each other, and the types of the DMRSs in the remaining M−2 slots are identical with each other.

(3) According to the indication of the base station, the type of the DMRS in the first slot among the M slots is determined, and the types of the DMRSs in the remaining M−1 slots are determined according to a predetermined rule; or, the type of the DMRS in the first slot among the M slots and the type of the DMRS in the last slot among the M slots are determined, and the types of the DMRSs in the remaining M−2 slots are determined according to the predetermined rule; or, the type of the DMRS in the first slot among the M slots and the type of the DMRS in the last slot among the M slots are determined respectively, and the types of the DMRSs in the remaining M−2 slots are determined according to the predetermined rule. The predetermined rule is that the types of the DMRSs in the remaining M−1 or remaining M−2 slots are the type A; or the predetermined rule is that the types of the DMRSs in the remaining M−1 or remaining M−2 slots are the type B.

(4) According to the indication of the base station, the resources in time domain of the PUSCH in the M slots are determined, and the resources in time domain of the PUSCH are same for each slot. If there is a space between the resources of the PUSCH in the respective slots, the second type of LBT, for example the 25 µs LBT, may be performed before another slot starts after the UE completes the first type of LBT for the first time.

(5) According to the indication of the base station, the resources in time domain of the PUSCH in the M slots are determined, wherein the resources in time domain of the PUSCH in the first and last slots are determined according to the indications in the DCI, while the PUSCHs in the middle M−2 slots occupy one entire slot.

(6) The base station may indicate whether to determine a resource mapping in time domain of the PUSCH in the M slots according to the manner of (4) or (5). For example, the base station may configure on which manner is based to determine the patterns of the PUSCH and the DMRS when it configures the information on the time resource of the PUSCH. For example, information mappingType_per_slot may be added in PUSCH-TimeDomainResourceAllocation, in order to indicate whether the pattern of the PUSCH is determined based on the manner of (4) or (5). As another example, the base station indicates which manner is used by a separated bit field in the DCI, or by reusing other bit field.

```
PUSCH-TimeDomainResourceAllocationList ::= SEQUENCE
(SIZE(1..maxNrofUL-Allocations)) OF
PUSCH-TimeDomainResourceAllocation
    PUSCH-TimeDomainResourceAllocation ::= SEQUENCE {
    k2 INTEGER(0..32) OPTIONAL, -- Need S
    mappingType ENUMERATED {typeA, typeB},
    mappingType_per_slot ENUMERATED {type1, type2},
    startSymbolAndLength INTEGER (0..127)
    }
```

Accordingly, there may be a one-to-one correspondence relationship between the determination of the resources mapping manner in time domain of the PUSCH and the pattern in time domain of the DMRS. For example, the DMRS might utilize (1) if the PUSCH utilizes (4), and the DMRS might utilize (3) if the PUSCH utilizes (5).

Further, the determination of the resources mapping manner in time domain of the PUSCH may be independent of the determination of the pattern in time domain of the DMRS.

If a scheduling granularity of the PUSCH is a sub-slot, the methods described above are also applicable, as long as the slot is replaced with the sub-slot.

If it is the transmission of PUSCH in the M slots for the GUL, the methods described above are also applicable. Wherein the indication of the base station is transmitted via the DCI activating the GUL transmission, or is born by the higher signaling configuring the GUL transmission.

Embodiment 7

In the step 201, the downlink control information comprises at least information on Modulation and Coding Scheme (MCS) for the PUSCH and information based on Code Block Group (CBG).

In the step 202, the determining the transmitting of the uplink signal comprises transmitting of the PUSCH through the selected CBG.

When the base station schedules the UE to transmit on M>1 slots via one DCI or the base station configures the UE to transmit on the M>1 slots via higher layer signaling, the CBG and/or MCS of the PUSCH in the M slots may be determined according to at least one of following manners.

(a) if the DCI indicates that a PUSCHi includes only a portion of CBGs in one TB, a size of the transport block TB for this PUSCH is determined by TB size indicated in a DCI$_j$ scheduling this TB last time. If the last DCI scheduling this TB scheduled single PUSCH and the indicated MCS is a value among 0–27, then this DCI is the DCI$_j$. If the last DCI scheduling this TB scheduled M>1 PUSCHs and all CBGs of this TB are scheduled, for example, it is indicated as a TB-based transmission, then this DCI is DCI$_j$.

For example, one DCI may schedule the M>1 PUSCHs, and the DCI may include a bit field for indicating whether the respective PUSCHs are transmissions based on TB or CBG, which includes a CBGTI indication for the CBG-based PUSCH transmission and a NDI (New Data Indicator) indication for the TB-based PUSCH transmission. If the DCI indicates that the PUSCHi among the M PUSCHs is the CBG-based PUSCH transmission and the CBGTI indicates that the PUSCHi includes only the portion of CBGs in one TB, then the UE would determine the size of the TB for the PUSCHi according to MCS information indicated by the last DCI scheduling this TB and including a size information of the TB, instead of the MCS indicated by the current DCI. If the DCI indicates that the PUSCHi among the M PUSCHs is the TB-based PUSCH transmission, the UE would determine the size of the TB according to the MCS indicated by the current DCI.

(b) if the DCI indicates that the PUSCHi is CBG-based transmission and the value of the CBGTI belongs to a set A, then TB size for the PUSCH is determined according to TB size indicated in a $DCI_j$ scheduling this TB last time. If the DCI indicates that the value of the CBGTI of the PUSCHi belongs to a set B, TB size for the PUSCH is determined according to TB size indicated in the DCI. An intersection of the set A and the set B is a Null set. If the DCI indicates that the PUSCHi is CBG-based transmission, then TB size for this PUSCH is determined by TB size indicated in the DCI. If the last DCI scheduling this TB scheduled single PUSCH and the indicated MCS is one among 0~27, then this DCI is the $DCI_j$. If the last DCI scheduling this TB scheduled the M>1 PUSCHs and indicated as the TB-based transmission, or the value of the CBGTI for this TB indicated by the DCI belongs to the set B, then this DCI is the $DCI_j$.

Preferably, the set B comprises a value for CBGTI being all 0.

Preferably, the set A comprises all remaining values for CBGTI excluding all 0.

Preferably, the set B comprises a value for CBGTI being all 1.

Preferably, the set A comprises all remaining values for CBGTI excluding all 1.

For example, one DCI may schedule the M>1 PUSCHs, and the DCI may include a bit filed for indicating whether the respective PUSCHs are TB or CBG-based transmissions, which includes a CBGTI indication for CBG-based PUSCH transmission and a NDI (New Data Indicator) indication for the TB-based PUSCH transmission. Assuming that the set B comprises the value for CBGTI being all 1 and the set A comprises all remaining values for CBGTI excluding all 1. If the DCI indicates a PUSCHi among the M PUSCHs is a CBG-based PUSCH and the CBGTI indicates that the PUSCHi comprises only a portion of CBGs in one TB (namely, the CBGTI is neither all 0 nor all 1), or the CBGTI indicates that the PUSCHi comprises all CBGs in one TB and the value of the CBGTI is all 0, then the UE would determine TB size according to MCS information indicated by a last DCI scheduling this TB and including TB size, instead of determining TB size for the PUSCHi according to the MCS indicated by the current DCI. If the DCI indicates that the PUSCHi among the M PUSCHs is a TB-based PUSCH, or is CBG-based transmission and the value of the CBGTI is all 1, then the UE would transmit all CBGs of this TB and determine TB size according to the MCS indicated by the current DCI.

Preferably, the UE not only determines the size of the TB according to the $DCI_j$, but also determines a modulation scheme according to the MCS indicated by the $DCI_j$.

Preferably, the UE determines the size of the TB according to the $DCI_j$, and determines the modulation scheme according to a modulation scheme indication bit field of the current DCI. For example, one DCI comprises a MCS bit field and further comprises a modulation scheme bit field. The TB size for the PUSCH scheduled by this DCI, the modulation and a code rate are determined according to the MCS bit field in the DCI, or the modulation scheme is determined by the modulation scheme bit field in the DCI, the TB size is determined according to the MCS indicated by the $DCI_j$, and the code rate is determined according to time-frequency resources indicated by this DCI.

According to another aspect of the present embodiment, when the size of the TB is determined according to the MCS indicated by the DCIj, time-frequency resources for calculating the TB size are determined by time-frequency resources indicated by the DCIj considering the time-frequency resources for SRS, if the time-frequency resources indicated by the DCIj overlap with the time-frequency resources for SRS. For example, assuming that the UE transmits no PUSCH in a symbol for transmitting the SRS, a number of symbols indicated by the DCIj is M wherein a number of symbols overlapping with the symbols for the SRS is N, then a number of resources (REs) for each PRB to calculate the size of the TB is $N'_{RE}=N_{rb\_sc}*(M-N)-Ndmrs-Nprb$, wherein $N_{rb\_sc}$ is a number of subcarriers in one RB, Ndmrs is a number of REs of DMRS in the each RB, and Nprb is a configured parameter. When transmitting resources for the PUSCH are determined according to the indicated time-frequency resources, a peak to average ratio (PAR) of the uplink signal may be reduced if no PUSCH is mapped in the symbols including the SRS for the time-frequency resources of the SRS and the time-frequency resources of the PUSCH.

Embodiment 8

In the step 201, the downlink control information comprises at least control information for scheduling M>1 PUSCHs. A DCI format for carrying the control information scheduling the M>1 PUSCHs is denoted as formats0-0B, formats0-1B.

In the step 202, the transmitting of the uplink signal comprises transmitting of the M PUSCHs according to an uplink schedule information.

In the prior art, when a search space is configured as a user-specific search space (USS), a configurable DCI format is formats0-0-And-1-0 or formats0-1-And-1-1. Wherein the DCI formats formats0-0, 1-0, 0-1 and 1-1 are all DCI formats supporting a single PDSCH or PUSCH schedule. In a new scene, a DCI format supporting M>1 PDSCHs or PUSCHs schedule is required, and how to configure the search space for such DCI format is a new issue. For a convenient description, the DCI format scheduling the single PDSCH is denoted as formats1-0A and formats1-1A, and the DCI format scheduling the multiple PDSCHs is denoted as formats1-0B and formats1-1B. The DCI format scheduling the single PUSCH is denoted as formats0-0A and formats0-1A, and the DCI format scheduling the multiple PUSCHs is denoted as formats0-0B and formats0-1B.

According to an implementation, as configuring the search space, the configurable DCI format comprises at least normal DCI formats scheduling the multiple PDSCHs or PUSCHs. The configurable DCI format further comprises the normal DCI formats scheduling the single PDSCH or PUSCH+normal DCIs scheduling the single PDSCH.

For example, when the one search space is configured as the user-specified search space (USS), the configurable DCI format is formats0-0-And-1-0 or formats0-1-And-1-1, or formats0-1B. Wherein the formats0-0 and 1-0 are fallback DCI formats, the formats0-1A is the normal DCI format scheduling the single PUSCH, the formats 1-1 is the normal DCI format scheduling the single PDSCH, and the formats0-1B is the normal DCI format scheduling the multiple PUSCHs.

```
SearchSpace ::=                    SEQUENCE {
...
    SearchSpaceType                CHOICE {
        ...
        ue-Specific                SEQUENCE {
                dci-Formats            ENUMERATED
{formats0-0-And-1-0, formats0-1A-And-1-1, formats0-1B},
                ...
        }
    }
}
```

The base station may provide the UE with not only the single PUSCH schedule but also the multiple PUSCHs schedule by configuring different USSs, for example, by configuring three USSs of which the corresponding DCI formats are formats0-0-And-1-0, formats0-1A-And-1-1 and formats0-1B, respectively. The base station also may schedule the single PUSCH by only configuring the USS. For example, two USSs are configured, their corresponding DCI formats are formats0-1-And-1-0 and formats0-1A-And-1-1, respectively.

According to an implementation, as configuring the search space, the configurable DCI format comprises at least DCI formats scheduling the multiple PUSCHs and scheduling the single PUSCH, e.g., the formats0-1B-And-1-1.

For example, when the one search space is configured as the user-specific search space (USS), the configurable DCI format is formats0-0-And-1-0 or formats0-1A-And-1-1, or formats0-1B-And-1-1.

```
formats0-1B-And-1-1.
SearchSpace ::=                    SEQUENCE {
...
    SearchSpaceType                CHOICE {
        ...
        ue-Specific                SEQUENCE {
                dci-Formats            ENUMERATED
{formats0-0-And-1-0, formats0-1A-And-1-1, formats0-1B-And-1-1},
                ...
        }
    }
}
```

The base station may provide the UE with both the single PUSCH schedule and the multiple PUSCHs schedule, or only the single PUSCH schedule or only the multiple PUSCHs schedules by configuring different USSs. For example, three USSs are configured, and their corresponding DCI formats are formats0-0-And-1-0, formats0-1A-And-1-1 and formats0-1B-And-1-1, respectively. Alternatively, two USSs are configured, and their corresponding DCI formats are formats0-0-And-1-0 and formats0-1A-And-1-1, respectively. Alternatively, two USSs are configured, and their corresponding DCI formats are formats0-0-And-1-0 and formats0-1B-And-1-1, respectively.

According to an implementation, as configuring the search space, the configurable DCI format comprises at least normal DCI formats scheduling the multiple PDSCHs or PUSCHs, and the normal DCI format scheduling the single PUSCH and the normal DCI format scheduling the single PDSCH.

For example, when the one search space is configured as the user-specified search space (USS), the configurable DCI format is formats0-0-And-1-0 or formats0-1A-And-1-1, or formats0-1B-And-1-1, or formats0-1B-And-formats0-1A-And1-1.

```
SearchSpace ::=                    SEQUENCE {
...
    SearchSpaceType                CHOICE {
        ...
        ue-Specific                SEQUENCE {
                dci-Formats            ENUMERATED
{formats0-0-And-1-0, formats0-1A-And-1-1, formats0-1B-And-1-1,
formats0-1B-And-formats0-1A-And1-1},
                ...
        }
    }
}
```

The base station may provide the UE with both the single PUSCH schedule and the multiple PUSCHs schedule, or only the single PUSCH schedule or only the multiple PUSCHs schedules by configuring different USSs. For example, two USSs are configured and their corresponding DCI formats are formats0-0-And-1-0 and formats0-1B-And-formats0-1A-And1-1, respectively, and the normal DCI may schedule both the single PUSCH and the multiple PUSCHs while the fallback DCI may schedule the single PUSCH. Alternatively, two USSs are configured and their corresponding DCI formats are formats0-0-And-1-0 and formats0-1B-And-1-1, respectively, and the normal DCI may schedule the multiple PUSCHs while the fallback DCI may schedule the single PUSCH. Alternatively, two USSs are configured and their corresponding DCI formats are formats0-0-And-1-0 and formats0-1A-And-1-1, respectively, and the normal DCI or the fallback DCI may schedule the single PUSCH.

According to an implementation, as configuring the search space, the configuration may skip certain DCI formats. For example, a dci-Formats may be configured as formats0-0-And-1-0 or formats0-1-And-1-1, and a configuration with a separate bit region may skip certain uplink DCI formats, for example, may skip any one of formats0-1A and formats0-1B.

Embodiment 9

In the step 201, the downlink control information is uplink schedule information, which is carried via an uplink fallback DCI, transmitted for scheduling the PUSCH.

In the step 202, the transmitting of the uplink signal comprises determining a LBT subband according to the uplink scheduling information and transmitting the PUSCH on the LBT subband.

In order to support a flexible uplink resource allocation, the uplink scheduling information carried by the normal uplink DCI comprises not only an indication on interlaced resource, but also an indication on the LBT subband. For example, a bandwidth of one uplink BWP is 80 MHz, which may be divided into 4 LBT subbands being not overlapped with each other. The normal uplink DCI comprises a bit field for indicating the interlace index(es) occupied by the PUSCH, and further comprises a bit field for indicating whether the PUSCH occupies one or more LBT subbands among these 4 LBT subbands.

Optionally, the uplink fallback DCI may also comprise these two indications in order to achieve the same flexibility of the resource allocation. To ensure a bit length of the uplink fallback DCI being fixed, a bit length indicating the LBT subband in the DCI is fixed, for example, fixed to $\log_2 \lceil (X*(X+1)/2) \rceil$, wherein X is predefined by standards or determined according to the bandwidth of the BWP, for example, $$X = \lceil \frac{\text{bandwidth of } BWP}{LBT \text{ subband}} \rceil.$$

As compared, a bit length for indicating the LBT subband is configurable in the normal DCI, for example, X is configurable.

Optionally, the uplink fallback DCI comprises no indication on the LBT subband, which can save DCI overload and would hardly affect the performance of system. According to an implementation, it is defined that the PUSCH scheduled by this DCI corresponds to the whole bandwidth of the uplink BWP. For example, a bandwidth of an active uplink BWP is 80 MHz, which is divided into 4 LBT subbands, and a bandwidth of a corresponding active downlink BWP is 80 MHz, which is divided into 4 LBT subbands similarly. No matter on which downlink LBT subband the UE receives a uplink fallback DCI scheduling the PUSCH, the PUSCH would locate in the 80 MHz of bandwidth of the active uplink BWP, that is, the allocated one or more interlaces occupy a portion of PRBs in the each UL LBT subband among the 4 UL LBT subbands. As another example, a bandwidth of an initial uplink BWP is 20 MHz, which is as same as the bandwidth of one LBT subband. The PUSCH scheduled by the uplink fallback DCI locates in one or more interlaces within the 20 MHz of bandwidth of the initial uplink BWP. According to another implementation, a number of the LBT subband at which the PUSCH scheduled by the DCI locates is defined to be same as that of the LBT subband at which the DCI is received. For example, the bandwidth of the active uplink BWP is 80 MHz, which is divided into 4 LBT subbands, and the bandwidth of the corresponding active downlink BWP is also divided into 4 LBT subbands. If the UE receives the uplink fallback DCI scheduling the PUSCH on the DL LBT subband 1, the PUSCH locates in the UL LBT subband 1.

Optionally, the uplink fallback DCI located in a common search space does not include LBT subband indication, while the uplink fallback DCI located in other search spaces includes the LBT subband indication.

Optionally, when the uplink DCI is required to be shortened, the bit portion for indicating the interlace would be shortened preferably or firstly. The LBT subband indication may be shortened only if the shortened bit portion for indicating the interlace is not enough to satisfy the requirements.

Optionally, when the uplink DCI is required to be shortened, the LBT subband indication would be shortened preferably or firstly. The bit portion for indicating the interlace may be shortened only if the shortened bit portion for indicating the LBT subband is not enough to satisfy the requirements.

Embodiment 10

In the step 201, the downlink control information is a control information on the configured GUL PUSCH resources.

In the step 202, the transmitting of the uplink signal comprises selecting, by the UE, an actual start point for the uplink transmission according to the control information on the configured GUL PUSCH resources and transmitting the GUL PUSCH based on the start point.

The control information on the GUL PUSCH resources comprises time resource information for the GUL PUSCH, for example, a start symbol of the GUL PUSCH time resource and/or information on a GUL PUSCH candidate transmitting start point. Wherein the GUL PUSCH candidate transmitting start point is determined according to the start symbol of the GUL PUSCH time resource and the information on the GUL PUSCH candidate transmitting start point with respect to the start symbol. For example, the start symbol of the GUL PUSCH time resource is Mth symbol in an uplink slot n. the information on the GUL PUSCH candidate transmitting start point is a set of time offsets {X1, X2, X3, . . . } with respect to the start point of the Mth symbol. Then, the GUL PUSCH candidate transmitting start point may be selected among symbols shifted {X1, X2, X3, . . . } backwards from the Mth symbol.

Optionally, the step 202 further comprises an actual transmitting start point indicated in the uplink control information UCI in the GUL PUSCH.

Then, the UE indicates the time offset of the actual transmitting start point with respect to a reference time point in the UCI after one GUL PUSCH candidate transmitting start point is selected, for example, the reference time point is the Mth symbol or a first symbol in the slot.

For example, the base station configures a fifth symbol ~ the fourteenth symbol in a nth slot as the GUL PUSCH time resource, and the time offset {X1, X2, X3, . . . }={16 μs, 25 μs, 34 μs, 43 μs, 52 μs, 61 μs, 70 μs}. Taking a case where a subcarrier interval is 30 KHz as an example, the GUL PUSCH candidate transmitting start point is determined as {within the 5th symbol, within the 5th symbol, the start point of the 6th symbol, within the 6th symbol, within the 6th symbol, within the 6th symbol, the start point of the 7th symbol} according to the start point of the GUL PUSCH time resource (the 5th symbol) and the information on the GUL PUSCH candidate transmitting start point {16 μs, 25 μs, 34 μs, 43 μs, 52 μs, 61 μs, 70 μs} with respect to the start symbol. The UE selects one start point from the set of the candidate transmitting start points, for example, the UE may select 70 μs, namely the start point of the 7th symbol as the actual transmitting start point to transmit the GUL PUSCH.

If UE indicates the actual transmitting start point by the UCI of the GUL PUSCH, and in this example, which symbol is the actual transmitting start point or how may symbol are shifted with respect to the 5th symbol may be indicated by 2 bit. For example, "00" represents an offset being smaller than 1 symbol but greater than 0 symbol with respect to the 5th symbol, "01" represents an offset being equal to 1 symbol with respect to the 5th symbol, "10" represents an offset being smaller than 2 symbols but greater than 1 symbol with respect to the 5th symbol, and "11" represents an offset being equal to 2 symbol.

Embodiment 11

In the step 201, the downlink control information comprises at least information on the PUSCH time resource.

In the step 202, the determining the transmitting of the uplink signal comprises determining the PUSCH transmitting uplink control information and transmitting the PUSCH and the uplink control information.

The downlink control information comprises a UL grant for the configured PUSCH transmission, or the downlink control information comprises schedule information for triggering the GUL PUSCH.

The uplink control information comprises at least HARQ-ACK.

Preferably, the uplink control information comprises at least channel information CSI.

Preferably, the uplink control information comprises at least schedule request SR.

The uplink control information may be carried via PUCCH, or may also be carried via PUSCH, for example, the uplink control information may be carried on the PUSCH when the PUCCH resource for the uplink control information of one UE overlaps with the time resource for the PUSCH of this UE.

Figure 11:
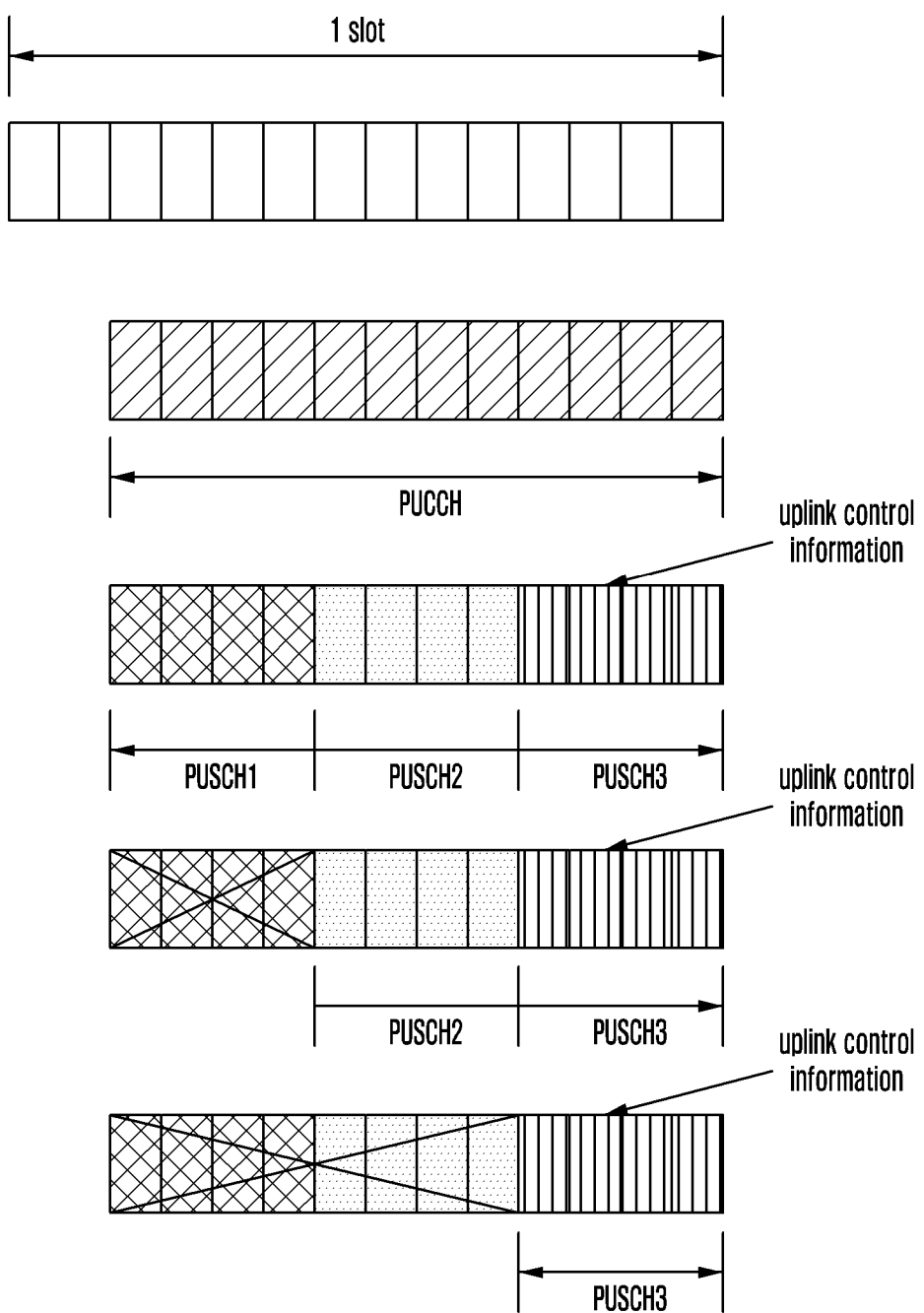
FIG. 11 is another exemplary view illustration for determining the transmitting process manner for determining of an uplink data channel signal according to the fourth exemplary embodiment of the present disclosure.

When one PUCCH resource overlaps with multiple PUSCH resources in time domain, if a processing latency can be satisfied, the uplink control information may be carried on the first overlapped PUSCH on the top in the time domain, which benefits decreasing of latency for the uplink control information. However, if the UE is required to perform the LBT before transmitting this PUSCH, for example, the PUSCH may be transmitted if and only if the LBT successes, transmitting of the uplink control information on the first overlapped PUSCH might lead to a reduced probability of transmitting the uplink control information by the UE. On the other hand, if the HARQ-ACK is transmitted on the last overlapped PUSCH, the probability of transmitting the uplink control information may be increased greatly. For example, the time resource for one PUCCH is the $3^{rd}$~$14^{th}$ symbols in one uplink slot, and in the same slot, the PUSCHs to be transmitted by the UE is a PUSCH1 occupying the $3^{rd}$~$6^{th}$ symbols, a PUSCH2 occupying the $7^{th}$~$10^{th}$ symbols and a PUSCH3 occupying the $11^{th}$~$14^{th}$ symbols. The uplink control information is carried on the PUSCH3, and the transmitting of the uplink control information could be ensured if the UE completes the LBT before the PUSCH1, PUSCH2 or PUSCH3 starts, as illustrated in FIG. 11. If the uplink control information is carried on the PUSCH1, the uplink control information would not be transmitted once the UE fails to complete the LBT before the PUSCH1 starts.

Preferably, processing manners are distinguished from unlicensed carriers and licensed carriers. For example, the uplink control information is transmitted on the last PUSCH overlapped with the PUCCH over the unlicensed carrier. And, the uplink control information is transmitted on the first PUSCH overlapped with the PUCCH or the first PUSCH satisfying the latency requirement over the licensed carrier.

Preferably, the UE may transmit the uplink control information on the first PUSCH overlapped with the PUCCH or the first PUSCH satisfying the latency requirement, if the UE requires no LBT before the one or more PUSCHs overlapped with the PUCCH.

Preferably, the UE may transmit the uplink control information on the first PUSCH overlapped with the PUCCH or the first PUSCH satisfying the latency requirement, if the UE requires no LBT, for example, Cat-1 LBT, before the one or more PUSCHs overlapped with the PUCCH. The UE may transmit the uplink control information on the last PUSCH overlapped with the PUCCH, if the UE requires the LBT.

Preferably, the UE may transmit the uplink control information on the first PUSCH overlapped with the PUCCH or the first PUSCH satisfying the latency requirement, if the UE requires no LBT or performs Cat-2 LBT, for example, a LBT with 16 μs or 25 μs, before the one or more PUSCHs overlapped with the PUCCH.

Preferably, the UE may transmit the uplink control information on the first PUSCH overlapped with the PUCCH or the first PUSCH satisfying the latency requirement, if the UE requires no LBT or performs Cat-2 LBT, for example, a LBT with 16 μs or 25 μs, before the one or more PUSCHs overlapped with the PUCCH. The UE may transmit the uplink control information on the last PUSCH overlapped with the PUCCH, if the UE requires to perform a Cat-4 LBT.

Preferably, the UE may transmit the uplink control information on the last PUSCH overlapped with the PUCCH, if the UE performs the Cat-4 LBT before the one or more PUSCHs overlapped with the PUCCH.

Preferably, if at least one PUSCH overlapped with the PUCCH locates in one slot of an uplink burst, the PUSCH carrying the uplink control information may be determined according to one of the manners described above.

Preferably, if at least one PUSCH overlapped with the PUCCH locates in the first slot of the uplink burst, then the UE may transmit the uplink control information on the last PUSCH overlapped with the PUCCH, otherwise, the UE may transmit the uplink control information on the first PUSCH overlapped with the PUCCH or the first PUSCH satisfying the latency requirement.

Preferably, the PUSCH carrying the uplink control information may be determined according to one of the manners described above if and only if the one or more PUSCHs overlapped with the PUCCH is a PUSCH having a mapping manner of Type-B. Otherwise, the UE may transmit the uplink control information on the first PUSCH overlapped with the PUCCH or the first PUSCH satisfying the latency requirement.

Embodiment 12

In the step 201, the downlink control information comprises at least information on time resource of the SRS.

In the step 202, the determining the transmitting of the uplink signal comprises transmitting of the SRS in a selected time resource pattern.

The information on the time resource of the SRS indicated in the downlink control information may comprise indication information indicating a position of the slot and/or symbol for transmitting the SRS. The indication information at least comprises one of following time information.

(1) A time offset between the slot at which the SRS is transmitted and the slot at which the DCI triggering the transmitting of the SRS is located.

(2) An index of a start symbol of the transmitted SRS, for example, if a value of the start symbol of the SRS is indicated as 0, it denotes that the start symbol of the SRS is located at the last symbol in one slot, and if the value of the start symbol of the SRS is 5, it denotes that the start symbol of the SRS is located at the sixth symbol countdown in one slot.

(3) The slot at which the SRS is transmitted is as same as the slot at which the PUSCH triggering the DCI scheduling of the SRS. Preferably, it may be combined with (2) to determine the symbol from which the SRS is started to be transmitted in the slot.

(4) The start symbol of the transmitted SRS is just adjacent to an end symbol of the PUSCH triggering the DCI scheduling of the SRS. For example, if the PUSCH is ended at the fourth symbol, the start symbol of the SRS is the fifth symbol. As another example, if the PUSCH is ended at the last symbol in a slot 1, the start symbol of the SRS is the first symbol in a slot 2.

(5) An end symbol of the transmitted SRS is just adjacent to the start symbol of the PUSCH triggering the DCI scheduling of the SRS. For example, if the PUSCH starts at the fourth symbol, the end symbol of the SRS is the third symbol.

(6) The transmitted SRS is just adjacent to the PUSCH triggering the DCI scheduling of the SRS in time. Preferably, it may be combined with (1) to determine the slot of the SRS, and determine the start symbol or end symbol of the SRS in this slot so as to be just adjacent to the PUSCH in time.

(7) The slot at which the SRS is transmitted is as same as the slot at which the PUCCH triggering the DCI scheduling of the SRS. Preferably, it may be combined with (2) to determine the symbol from which the SRS is started to be transmitted in the slot.

(8) The start symbol of the transmitted SRS is just adjacent to an end symbol of the PUCCH triggering the DCI scheduling of the SRS.

(9) An end symbol of the transmitted SRS is just adjacent to the start symbol of the PUCCH triggering the DCI scheduling of the SRS.

(10) The transmitted SRS is just adjacent to the PUCCH triggering the DCI scheduling of the SRS in time. Preferably, it may be combined with (1) to determine the slot of the SRS, and determine the start symbol or end symbol of the SRS in this slot so as to be just adjacent to the PUCCH in time.

(11) If the PUSCH triggering the DCI scheduling of the SRS is a PUSCH with M slots, a configured slot offset is the first slot with respect to the PUSCH and an amount of the slot offset modulus M.

After the UE succeeds in occupying the channel by the first type of LBT, the UE transmits a plurality of uplink channels/signals in the COT, which are not adjacent in time, and the UE may perform the second type of LBT before transmitting the signals.

The base station may configure the different time information described above for the different SRS resources when the base station configures the SRS resources. The base station may also configure different time information for the different DCIs, such as the DCI scheduling the PUSCH, or the DCI scheduling the PDSCH, or the DCI specified to the SRS.

The base station may indicate at least one of the above time information by a separate bit field or by reusing other bit fields in the DCI.

The information on the time resources of the SRS indicated in the downlink control information, if the SRS resources to be transmitted are continuous X symbols in time, the UE transmits remaining Y symbols from a nearest SRS symbol after completing the LBT, wherein $Y \leq X$.

The information on the time resource of the SRS indicated in the downlink control information, if SRSs in a group of SRSs comprise N SRS resources, N>1, the UE may exchange orders in time of the N SRS resources sequentially in a predetermined order whenever the UE transmits the group of SRSs. For example, one group of SRSs comprises 4 SRS resources each being 1 symbol and being just adjacent with each other, each of the SRS resources corresponds to different transmission antenna port respectively, which is antenna ports 0, 1, 2, 3 sequentially. As such, the UE may transmit the respective SRSs for the ports 0, 1, 2, 3 on 4 symbols sequentially when the UE transmits the group of SRSs for the first time, the UE may transmit the respective SRSs for the ports 1, 2, 3, 0 on the 4 symbols sequentially when the UE transmits the group of SRSs for the second time, the UE may transmit the respective SRSs for the ports 2, 3, 0, 1 on the 4 symbols sequentially when the UE transmits the group of SRSs for the third time, and the UE may transmit the respective SRSs for the ports 3, 0, 1, 2 on 4 symbols sequentially when the UE transmits the group of SRSs for the fourth time. With doing so, when one group of SRS is transmitted once a time, even if previous one or more SRSs fail to be transmitted due to a late ending of the LBT, transmitting positions for them are later in a subsequent process and a probability of successful transmission is enhanced.

Embodiment 13

In the step 201, the downlink control information comprises at least information for triggering the HARQ-ACK transmission.

In the step 202, the determining the transmitting of the uplink signal comprises determining a HARQ-ACK bit in the PUCCH and transmitting the PUCCH.

The information for triggering the HARQ-ACK transmission comprises carrier information on HARQ-ACK to be feedback. For example, in the DCI triggering the HARQ-ACK feedback, whether the HARQ-ACK feedback is required is determined in a manner of bitmap for each of the configured or active carrier. A value of X1 for the bit corresponding to the respective carrier indicates that this carrier requires the HARQ-ACK feedback, while the value of X2 for the bit indicates that this carrier requires no HARQ-ACK feedback. As another example, the higher layer configures combinations of a plurality of carriers, and indicates one of the combinations to determine which carrier(s) requires the HARQ-ACK feedback and/or which carrier(s) requires no HARQ-ACK feedback, in the DCI triggering the HARQ-ACK feedback. Assumed that the base station configures M bits for indicating the HARQ-ACK feedback information on the respective carriers, which correspond to the combinations for 2M carrier information. If a carrier i is included in the indicated combination, the HARQ-ACK corresponding to the carrier is required to be feedback. For example, four downlink carriers, carriers 1~4, are included in one PUCCH group, and each of the carriers is configured with 16 HARQ processes respectively. The base station configures 2 bits, whose values are 0~3, to correspond to four carrier combinations respectively. The carrier combination 1 comprises carriers 1, 2, the carrier combination 2 comprises carriers 2, 3, the carrier combination 3 comprises carriers 3, 4, and the carrier combination 4 comprises carriers 1~4. If the base station indicates the carrier combination 1, the UE feedbacks 16 HARQ processes for the carrier 1 and the carrier 2, that is, 32 bits of HARQ-ACK are feedback in total. If the base station indicates the carrier combination 4, the UE feedbacks 16 HARQ processes for the carriers 1~4, that is, 64 bits of HARQ-ACK are feedback in total.

Furthermore, it may be determined whether the respective carriers i in within one carrier feedback the HARQ-ACK for all of the HARQ processes or only HARQ-ACK for some HARQ processes of the carrier i is feedback, based on the configuration of the base station or predetermined rules. For example, the base station configures HARQ process groups for the respective carriers semi-statically, and each HARQ process group comprises one or more HARQ processes. In an actual system, a number of the HARQ processes configured for the respective carriers may be different, and a configuration of the HARQ process group may also be different. Preferably, the base station indicates indices of the HARQ process group for a same carrier group to be same. For example, there are two bit regions in the DCI, one bit region indicates information on a carrier group, and the other indicates the HARQ process group for the carrier group. As another example, the base station configures the HARQ process group being common to a carrier group as configuring the information on the carrier group, and the information on the carrier group and the HARQ process group is indicated by one bit region in the DCI. Preferably, the base station may indicate the indices of the HARQ process group for a same carrier group to be different. For example, the base station configures the HARQ process groups for the respective carriers in the carrier group as configuring the information on the carrier group, and the information on the carrier group and the HARQ process group is indicated by one bit region in the DCI. Making four carriers as an example. Assumed that the carrier 1 has four HARQ processes 0~3 and the carrier 2 has sixteen HARQ processes 0~15. The base station configures four carrier groups, wherein a first carrier group comprises all of the HARQ processes of the carrier 1, the second carrier group comprises all of the HARQ processes of the carrier 2, the third carrier group comprises the HARQ processes 0~1 of the carrier 1 and the HARQ processes 0~7 of the carrier 2, and the fourth carrier group comprises the HARQ processes 2~3 of the carrier 1 and the HARQ processes 8~15 of the carrier 2. Two bits in the DCI indicate these four carrier groups and corresponding one of the HARQ process groups. The UE determines the HARQ-ACK bit in the PUCCH according to the configured carrier group and the HARQ processes together with the indication in the DCI.

Preferably, the information on the HARQ-ACK transmission for one UE or a plurality of UEs is indicated in a special DCI format. A length of bits of the information on the HARQ-ACK transmission for each UE is configurable or predetermined. For example, in the bits of the information on the HARQ-ACK transmission for each UE, a carrier information bit region, and/or a HARQ process group information bit region (all of the configured HARQ processes, or the HARQ process groups), and an indication information bit region for indicating whether the base station receives the HARQ-ACK feedback for the respective HARQ processes (for example, the respective HARQ processes, or the respective HARQ process groups, or the respective PDSCH groups have a bit indication for indicating whether the UE retransmits the HARQ-ACK for the HARQ process, the HARQ process groups or the PDSCHs in the PDSCH group) may be configured respectively, for example, whether the corresponding bit region is included or the length of the bit region may be configured.

Embodiment 14

In the step 201, the downlink control information comprises at least information on triggering a HARQ-ACK transmission.

In the step 202, the determining the transmitting of the uplink signal comprises determining HARQ-ACK bit in the PUCCH and transmitting the PUCCH.

In order to support a HARQ-ACK feedback based a dynamic codebook, a bit field for the HARQ-ACK feedback is required in a downlink DCI for the scheduled PDSCH. In order to support a HARQ-ACK retransmission, the bit field for the HARQ-ACK feedback comprises group information on the HARQ-ACK feedback (PDSCH group index), HARQ-ACK value indication information for each group of the HARQ-ACK feedback (ACK-feedback group indicator), HARQ-ACK feedback request group information (PDSCH set) and a Downlink Assignment Index (DAI). A plurality of PDSCHs scheduled by the base station may be grouped into one or more PDSCH groups, and the HARQ-ACKs for all PDSCHs in a same PDSCH group are fed back in a same PUCCH. The base station indicates to which PDSCH group the PDSCH scheduled currently belongs by the PDSCH group index. Each PDSCH group has an ACK-feedback group indicator for indicating whether the HARQ-ACK information on the last HARQ-ACK feedback is further required to be feedback when the UE feedbacks the HARQ-ACK for the current PDSCH. For example, if the ACK-feedback group indicator is toggled with respect to the last ACK-feedback group indicator in the same group, then the last HARQ-ACK information (the last HARQ-ACK information may comprise the HARQ-ACK for one or more PDSCHs belonging to the same group) is not required to be feedback in the current feedback. If the ACK-feedback group indicator is unchanged with respect to the last ACK-feedback group indicator in the same group, the last HARQ-ACK information is required to be transmitted together with the current feedback. The HARQ-ACK feedback request group information, namely the PDSCH set, is a set of PDSCH groups whose HARQ-ACKs are required to be feedback simultaneously in the same PUCCH. For example, the HARQ-ACK feedback request group information comprises a HARQ-ACK feedback only triggering the PDSCH group scheduled currently, HARQ-ACK feedbacks for the PDSCH group scheduled currently and at least one other group and the HARQ-ACK feedbacks for all PDSCH groups. Wherein the HARQ-ACK feedbacks for the PDSCH group scheduled currently and at least one other group are combinations predefined by standards or configured by higher layer signal. As another example, the HARQ-ACK feedback request group information further comprises the HARQ-ACK feedbacks for all HARQ-ACK processes. As a still another example, the HARQ-ACK feedback request group information further comprises the HARQ-ACK feedback only triggering one or more PDSCH groups except for the PDSCH group scheduled currently. Taking 2 PDSCH groups as an example, for a 1 bit of HARQ-ACK feedback request group information, "00" represents triggering of the PDSCH group scheduled currently, and "1" represents 2 PDSCH groups. Alternatively, for a 2-bit of HARQ-ACK feedback request group information, "00" represents triggering of the PDSCH group scheduled currently, "01" represents triggering of the 2 PDSCH groups, and "10" represents triggering of the PDSCHs of all HARQ processes.

Assuming that the plurality of PDSCHs scheduled by the base station may be grouped into 2 PDSCH groups at most, the corresponding PDSCH group indices are 0 and 1 respectively, and the 1-bit HARQ-ACK feedback request group information is for the each PDSCH group, wherein a value 0 of the 1-bit PDSCH set represents that only the HARQ-ACK for this PDSCH group to which the current PDSCH belongs is fed back, and a value 1 represents that the HARQ-ACKs for the two PDSCH groups are fed back. In the each group, bit number of the HARQ-ACK and bit ranking of the HARQ-ACK for the each group are determined according to a count DAI (C-DAI) in the DCI and a total DAI (T-DAI), respectively. Based on the bit field indication for the HARQ-ACK feedback described above, the base station may support the HARQ-ACK retransmission for the multiple PDSCH groups flexibly. An expense is bound that a DCI overhead is large, especially when the number of the PDSCH groups is great, for example, when the number of the PDSCH group is 4, the required overhead is up to 13 bits (2 bits for the PDSCH group index, 4 bits for the ACK-feedback group indicator, 3 bits for the PDSCH set, and 4 bits for the DAI). If all of these bit fields are included in the downlink fallback DCI, it may result in decreasing of detection performance and a robustness of the system may be affected.

In order to achieve a tradeoff between the robustness and the flexibility, different HARQ-ACK feedback bit field may be designed for the normal DCI and the fallback DCI.

Optionally, in order to ensure the flexibility, the number of the PDSCH groups supportable in the normal downlink DCI is configurable or fixed to a number which is greater than that of the PDSCH groups supportable in the fallback DCI. For example, the base station configures the number of the PDSCH groups supportable in the normal downlink DCI as 2 or 3 or 4. Accordingly, the number of total bits is 8 bits (1 bit for PDSCH group index, 2 bits for ACK-feedback group indicator, 1 bit for PDSCH set and 4 bits for DAI), 11 bits (2 bit for PDSCH group index, 3 bits for ACK-feedback group indicator, 2 bits for PDSCH set and 4 bits for DAI) and 13 bits (2 bits for PDSCH group index, 4 bits for ACK-feedback group indicator, 3 bits for PDSCH set and 4 bits for DAI).

Optionally, the bit field for the HARQ-ACK feedback in the downlink fallback DCI is predefined. The bit field and/or bit number, associated with the PDSCH group, for the HARQ-ACK feedback in the downlink fallback DCI is smaller than the bit field and/or bit number, associated with the PDSCH group, for the HARQ-ACK feedback in the normal DCI. For example, the bit field associated with the PDSCH group, for the HARQ-ACK feedback in the downlink fallback DCI comprises only C-DAI, or comprises only the C-DAI and the ACK-feedback group indicator, or comprises only the C-DAI, PDSCH group index and the ACK-feedback group indicator, while the bit field, associated with the PDSCH group, for the HARQ-ACK feedback in the normal DCI comprises the PDSCH group index, the ACK-feedback group indicator, the PDSCH group set and DAI.

According to an example, the downlink fallback DCI comprises a 1-bit PDSCH group index, with 0 representing the PDSCH group 0 and 1 representing the PDSCH group 1. Alternatively, no PDSCH group index is included, and the PDSCH group to which the PDSCH scheduled by the downlink fallback DCI belongs is fixed to a predefined PDSCH group, for example, the PDSCH group 0. Further, the downlink fallback DCI also comprises a 1-bit ACK-feedback group indicator, corresponding to the current PDSCH group. No bit field indicating the PDSCH set is included, that is, it is assumed that only the HARQ-ACK feedback for the PDSCH group to which the current PDSCH belongs is fed back. And only the C-DAI is included. Optionally, for the same PUCCH, if the UE only receives the PDSCH scheduled by the downlink fallback DCI, the UE determines the HARQ-ACK feedback according to only the bit field in the downlink fallback DCI and only feeds back the HARQ-ACK for the PDSCH group to which the current PDSCH belongs. For the same PUCCH, if the UE receives both the PDSCH scheduled by the downlink fallback DCI and the PDSCH scheduled by the normal DCI, it may determine the PDSCH group set of the HARQ-ACK feedback and the ACK-feedback group indicators of the respective PDSCHs according to the PDSCH set indicated in the normal DCI. For example, the base station schedules the PDSCH 1 through the normal DCI 1 indicating that PDSCH group index='00', ACK-feedback group indicator='0000', PDSCH set='000' (representing that only the current PDSCH group 0 is fed back), C-DAI=1, T-DAI-1; the base station schedules the PDSCH 2 through the fallback DCI 2 indicating that ACK-feedback group indicator='0', C-DAI=2 (the PDSCH 2 belongs to the predefined PDSCH group 0, therefore the PDSCH 1 and PDSCH 2 belong to the same PDSCH group, the C-DAI of the PDSCH 2 is accumulated based on the PDSCH 1, and the ACK-feedback group indicator of the PDSCH 2 indicates that the HARQ-ACKs for both the PDSCH 1 and the PDSCH 2 belonging to the PDSCH group 0 are required to be fed back); the base station schedules the PDSCH 3 through the normal DCI 3 indicating that the PDSCH group index='01', ACK-feedback group indicator='0000', PDSCH set='001' (representing that the current PDSCH group 1 and the previous PDSCH group 0 are fed back), C-DAI=1, T-DAI=1. Then, after the UE receives the DCI 3, the HARQ-ACKs for the PDSCH 1, PDSCH 2 and PDSCH 3 are fed back in the same PUCCH. If the UE fails to receive the DCI 3 and DCI 1, but only receives the DCI 2, the UE may feedback the 2-bit HARQ-ACK for the PDSCH group 0 in the same PUCCH, wherein the HARQ-ACK for the PDSCH 2 corresponds to the $2^{nd}$ bit.

According to another example, the downlink fallback DCI comprises a 1-bit PDSCH group index, with 0 representing PDSCH group 0 and 1 representing PDSCH group 1, or no PDSCH group index is included and the predefined PDSCH group is fixed. Neither the PDSCH set nor the ACK-feedback group indicator is indicated, and only the HARQ-ACK for the PDSCH group to which the current PDSCH belongs is fed back. Only C-DAI is included. Optionally, for the same PUCCH, if the UE only receives the PDSCH scheduled by the downlink fallback DCI, the UE may determine the HARQ-ACK feedback according to the bit field in the downlink fallback DCI, only feeds back the HARQ-ACK for the PDSCH group to which the current PDSCH belongs, and it is assumed that the ACK-feedback group indicator is toggled, so the previous HARQ-ACKs are not required to be retransmitted. For the same PUCCH, if the UE receives both the PDSCH scheduled by the downlink fallback DCI and the PDSCH scheduled by the normal DCI, the UE may determine the PDSCH group(s) requiring the feedback of the HARQ-ACKs according to the PDSCH group indicated in the normal DCI, and determine whether the HARQ-ACKs for the respective PDSCH groups are required to be retransmitted according to the ACK-feedback group indicators of the respective PDSCH groups.

According to another example, the downlink fallback DCI comprises the C-DAI, but does not comprise the PDSCH group index, the ACK-feedback group indicator or the PDSCH set. Optionally, the PDSCH, which is scheduled by the downlink fallback DCI including no HARQ-ACK feedback bit field related to the PDSCH group, is treated as belonging to the first group of PDSCH (equivalent to PDSCH group index=0) and the ACK-feedback group indicator being toggled, and only the HARQ-ACK for this group of PDSCHs could be fed back while the feedback of the HARQ-ACKs for other PDSCH groups is forbidden. Optionally, for the same PUCCH, if the UE only receives the downlink fallback DCIs, the PDSCHs scheduled by these downlink fallback DCIs belong to the same PDSCH group 0, and the UE determines the PUCCH according to only a HARQ-ACK feedback timing K1 indicated in the downlink fallback DCI, and determines a bit number of the HARQ-ACKs for the PDSCH group 0, which are fed back in the same PUCCH, according to the C-DAI in the downlink fallback DCI and by assuming that the ACK-feedback group indicator being toggled. Optionally, for the same PUCCH, the UE receives both the downlink fallback DCI and a DCI comprising the HARQ-ACK feedback bit field related to the PDSCH group, the UE may determine the HARQ-ACK feedback according to the HARQ-ACK feedback bit field related to the PDSCH group of the latter. For example, the base station schedules the PDSCH 1 through the normal DCI 1 in a slot n, K1=4, which indicates that PDSCH group index='00', ACK-feedback group indicator='0000', PDSCH set='000' (representing that only the current PDSCH group 0 is fed back), C-DAI=1, T-DAI=1; the base station schedules the PDSCH 2 through the fallback DCI 2 in a slot n+1, K1=3, which indicates that C-DAI=2; and the base station schedules the PDSCH 3 through the normal DCI 3 in a slot n+8, K1=2, which indicates that PDSCH group index='01', ACK-feedback group indicator='0000', PDSCH set='001' (representing that the current PDSCH group 1 and the PDSCH group 0 are fed back), C-DAI=1, T-DAI=1. Then, because the PDSCH 1 and PDSCH 2 belongs to the same PDSCH group 0 and the HARQ-ACKs for these two PDSCHs are transmitted in the same PUCCH according to K1, the UE transmits the HARQ-ACKs for the PDSCH 1 and PDSCH 2 in a slot n+4. After the UE receives the DCI 3 in the slot n+8, the UE feeds back the HARQ-ACKs for the PDSCHs 1, 2, 3 in a slot n+10. As another example, the base station schedules the PDSCH 1 through the normal DCI 1 in the slot n, K1=4, which indicates that PDSCH group index='10', ACK-feedback group indicator='0000', PDSCH set='000' (representing that only the current PDSCH group 0 is fed back), C-DAI=1, T-DAI=1; the base station schedules the PDSCH 2 through the fallback DCI 2 in a slot n+7, K1=3, which indicates that C-DAI=1; and the base station schedules the PDSCH 3 through the normal DCI 3 in the slot n+8, K1=2, which indicates that PDSCH group index='00', ACK-feedback group indicator='0000', PDSCH set='011' (representing that the current PDSCH group 0 and the PDSCH group 2 are fed back), C-DAI=2, T-DAI=2. Then, after the UE receives the DCI 3, the UE may decide that both the PDSCH 2 and the PDSCH 3 belong to the PDSCH group 0, and belong to the same PUCCH according to K1. According to the indication in the DCI 3, UE feeds back the HARQ-ACKs for the PDSCH 1, PDSCH 2, and PDSCH 3 in the same PUCCH. If the UE only receives the DCI 2 without receiving the DCI 3, the UE may only feed back the HARQ-ACK for the PDSCH 2 in the PUCCH.

Optionally, the bit field for the HARQ-ACK feedback included in the downlink fallback DCI is distinguished from a primary cell and a secondary cell. Optionally, the downlink fallback DCI format of the secondary cell comprises the group information PDSCH group index for the HARQ-ACK feedback, the HARQ-ACK value indication information ACK-feedback group indicator of the current PDSCH group, or comprises only the PDSCH group index or comprises only the ACK-feedback group indicator. The downlink fallback DCI format of the primary cell comprises neither of the above two information. For example, a downlink fallback DCI format 1-0 of the secondary cell comprises a 1-bit PDSCH group index, a 1-bit ACK-feedback group indicator of the current PDSCH group, and a 2-bit C-DAI. A DCI format 1-0 of the primary cell comprises only the 2-bit C-DAI.

Furthermore, the downlink fallback DCI in the common search space of the primary cell comprises no HARQ-ACK feedback bit field related to the PDSCH group, and the downlink fallback DCI in the common search space of the primary cell is same as the HARQ-ACK feedback bit field in the downlink fallback DCI format of the secondary cell in composition.

Alternatively, the downlink fallback DCI in the common search space in an initial BWP of the primary cell comprises no HARQ-ACK feedback bit field related to the PDSCH group, and the other downlink fallback DCI of the primary cell is same as the HARQ-ACK feedback bit field in the downlink fallback DCI format of the secondary cell in composition.

Optionally, the bit field for the HARQ-ACK feedback included in the downlink fallback DCI in the common search space is different from that in the user-specific search space. The bit field for the HARQ-ACK feedback included in the downlink fallback DCI in the common search space is less than that in the user-specified search space. For example, the bit field for the HARQ-ACK feedback included in the downlink fallback DCI in the user-specified search space comprises the group information PDSCH group index of the HARQ-ACK feedback, the HARQ-ACK value indication information ACK-feedback group indicator of the current PDSCH group and the C-DAI, while the bit field for the HARQ-ACK feedback included in the downlink fallback DCI in the common search space comprises only the C-DAI. Alternatively, the bit field for the HARQ-ACK feedback comprises the group information PDSCH group index of the HARQ-ACK feedback and the C-DAI, or the ACK-feedback group indicator and the C-DAI.

The diverse designs of the downlink fallback DCI for the different search spaces and/or different cells can reduce overhead required for the schedule system information and the downlink fallback DCI of the PDSCH before a RRC connection establishment. The system needs no HARQ-ACK feedback, therefore the bit field for the HARQ-ACK feedback in the DCI is unnecessary. The HARQ-ACK for the PDSCH before the RRC connection establishment needs no PDSCH group, therefore the bits, related to the PDSCH group, in the bit field for the HARQ-ACK feedback is also unnecessary. The efficiency may be improved by reducing the bit overhead of the HARQ-ACK feedback in the downlink fallback DCI in the common search space or the user-specified search space.

In order to distinguish the downlink fallback DCI including the bit field for the HARQ-ACK feedback related to the PDSCH group with the downlink fallback DCI including no bit field for the HARQ-ACK feedback related to the PDSCH group, two different DCI formats may be defined, alternatively, a same DCI format may be utilized with defining conditions on occurring of the bit field in the DCI format.

Embodiment 15

In the step 201, the downlink control information comprises at least information on triggering the HARQ-ACK transmission.

In the step 202, the transmitting of the uplink signal comprises transmitting the GUL PUSCH according to a determined ending position of the GUL PUSCH.

The information on triggering the HARQ-ACK transmission comprises information for determining the resource carrying the uplink channel of the HARQ-ACK. For example, HARQ-ACK timing information or resource information of the PUCCH may be included.

If the UE wants to transmit the PUCCH on a carrier i according to the received HARQ-ACK transmission information while the UE is transmitting the GUL PUSCH on another carrier j, the UE needs to stop transmitting this GUL PUSCH before time t. Wherein the time t is determined according to a reference start point of the PUCCH to be transmitted on the carrier i and a predetermined time difference. For example, the reference start point of the PUCCH is a start point of the first symbol of the PUCCH, or a start point of a slot or sub-slot at which the first symbol of the PUCCH locates. The predetermined time difference is X time units which may be a symbol, or a slot/sub-slot, or a CCA slot, or microsecond/millisecond, etc. The time t is ahead of the reference start point of the PUCCH by X time units. Preferably, if the time t does not belong to candidate ending positions of the GUL PUSCH, the transmitting of the GUL PUSCH would be stopped at a candidate ending position of the GUL PUSCH earlier than the time t. For example, the reference start point of the PUCCH is the start point of the PUCCH, a symbol #10 at a slot n, and the time difference X is 2 OFDM symbols. The candidate ending positions of the GUL PUSCH are symbols #12, 13. Then, the time t is determined as a symbol #8 at the slot n according to the reference start point of the PUCCH and the X, that is to say, the transmitting of the GUL PUSCH should be stopped before the symbol #8 in the slot n begins. However, since the symbol #8 is not the candidate ending position of the GUL PUSCH, the UE has to stop transmitting the GUL PUSCH on the symbol #12 or #13 in the slot n−1.

Preferably, X is predefined or configured by the base station.

Preferably, if the UE wants to transmit the PUSCH on the carrier i according the downlink control information UL grant received in the step 201 and the UE is transmitting the GUL PUSCH on another carrier j, the UE needs to stop transmitting the GUL PUSCH before time t1.

According to another aspect, in the step 201, the downlink control information comprises at least information on the PRACH resource.

In the step 202, the transmitting of the uplink signal comprises transmitting the GUL PUSCH according to the determined ending position of the GUL PUSCH.

If the UE wants to transmit the PRACH on a carrier i according to the received information on the PRACH resource while the UE is transmitting the GUL PUSCH transmission on another carrier j, the UE needs to stop transmitting this GUL PUSCH before time t. The manner for determining the time t is similar to those described above, and details are omitted herein.

Preferably, the time point at which the transmitting of the GUL PUSCH is stopped is different for different uplink channels to be transmitted on the carrier i or different contents carried in the uplink channels. For example, the time difference for determining to stop transmitting of the GUL PUSCH is X, if the uplink channel to be transmitted on the carrier i is the PUCCH or the PUSCH only carrying the uplink control information, or the uplink channel is the PRACH, and the time difference for determining to stop transmitting of the GUL PUSCH is X1, if the uplink channel to be transmitted on the carrier i is the PUSCH carrying the data, wherein X is not equal to X1, or the X and X1 are configured individually.

Embodiment 16

In the step 201, the downlink control information comprises at least an uplink schedule indication UL grant for scheduling the PUSCH.

In the step 202, the transmitting of the uplink data channel signal comprises determining a type of a channel access procedure prior to transmitting the uplink signal and transmitting the uplink signal according to the type of the channel access procedure after performing the LBT.

One uplink schedule indication UL grant may schedule one PUSCH only. Alternatively, the one UL grant schedules transmissions of M PUSCHs, wherein 1≤M≤Mmax, Mmax is the maximum number of PUSCHs that the one UL grant can schedule. The Mmax is predefined by standards or configured by the base station.

When the signal is transmitted on the unlicensed frequency band, the channel access procedure is generally performed before transmitting. The channel access procedure may comprises a plurality of types, for example, a first type of channel access procedure (may refer to the access procedure described in section 4.2.1.1 in standards TS 37.213), a second type of channel access procedure, such as the 16 μs LBT or 25 μs LBT (may refer to the access procedure described in section 4.2.1.2 in standards TS 37.213), a three type of channel access procedure, that is, no carrier listen/LBT is required. Each type of the channel access procedures corresponds to different scenarios, therefore the transmitting end should determine the corresponding type of channel access procedure according to the respective scenes. For example, when the base station occupies the channel through the first type of channel access procedure, a time interval between a downlink transmission in a downlink COT and a subsequent uplink transmission is equal to 16 μs, then the 16 μs LBT for the second type of channel access procedure may be performed before the uplink transmission. When the time interval between the downlink transmission in the downlink COT and the subsequent uplink transmission is equal to or greater than 25 μs, the 25 μs LBT for the second type of channel access procedure may be performed before the uplink transmission. If the uplink transmission is not in the downlink COT, the first type of channel access procedure is performed before the uplink transmission.

According to an implementation, the base station indicates the type of channel access procedure in the UL grant scheduling the PUSCH, and the UE perform the channel access according to the type of channel access procedure before transmitting the PUSCH. For example, 2 bits in the UL grant indicate the first type of channel access procedure, 16 μs LBT of the second type of channel access procedure, 25 μs LBT of the second type of channel access procedure and the third type of channel access procedure.

If the UE is scheduled by the UL grant capable of scheduling M>1 PUSCHs simultaneously to transmit these PUSCHs within a period of continuous time resources, and if the type of channel access procedure indicated in the UL grant is a special type A of channel access procedure, and if the UE has not succeeded in accessing the channel before the jth PUSCH is transmitted, then the UE could not access to the channel according to an indicated channel access type A until the (j+1)th PUSCH is transmitted, and accesses to the channel according to a channel access type B.

Preferably, the channel access type A is the second type of channel access procedure with 16 μs.

Preferably, the channel access type B is the second type of channel access procedure with 25 μs and the first type of channel access procedure.

For example, if the UE is scheduled by the UL grant capable of scheduling M>1 PUSCHs simultaneously to transmit these PUSCHs within a period of continuous time resources, and if the type of channel access procedure indicated in the UL grant is the 16 μs LBT for the second type of channel access procedure, and if the UE has not succeeded in accessing the channel before the jth PUSCH is transmitted, the UE could not access to the channel according to the indicated 16 μs LBT for the second type of channel access procedure until the (j+1)th PUSCH is transmitted, and accesses to the channel according to the 25 μs LBT for the second type of channel access procedure.

If the UE is scheduled by the UL grant capable of scheduling M>1 PUSCHs simultaneously to transmit these PUSCHs within a period of continuous time resources, and if the type of channel access procedure indicated in the UL grant is a special type C of channel access procedure, and if the UE has not succeeded in accessing the channel before the jth PUSCH is transmitted, the UE accesses to the channel according to the indicated channel access type C before the (j+1)th PUSCH is transmitted.

Preferably, the channel access type C is the second type of channel access procedure with 25 μs, the first type of channel access procedure and the third type of channel access procedure.

After the UE starts to transmit the (j+1)th PUSCH if the UE completes the channel access successfully before the (j+1) the PUSCH is transmitted, the UE may transmit the remaining PUSCHs continuously with no time intervals.

Some examples are given as follows based on the method described above.

The base station occupies the channel through the first type of channel access procedure, starts the uplink transmission at the slot n, and the downlink COT continues to the slot n+6 and ends. The base station transmits one UL grant at the slot n+1 to schedule M=4 PUSCHs, wherein the first PUSCH starts from the eighth symbol in the slot n+3 and tills to the end of the slot n+3. The $2^{nd}$~$4^{th}$ PUSCHs occupy the corresponding entire slots among the slots n+4~n+6, respectively, and are continuous in time. Because a time interval from the ending position of the downlink transmission by the base station in the first half of the slot n+3 to the start point of the first PUSCH is 16 μs, the base station indicates in the UL grant that the channel access type is the 16 μs LBT for the second type of channel access procedure. The UE shall attempt to transmit the first PUSCH according to the 16 us LBT for the second type of channel access procedure before the first PUSCH. If the LBT succeeds, the UE may transmit the scheduled 4 PUSCHs continuously. If the 16 μs LBT fails before the UE starts to transmit the first PUSCH, the UE shall not perform the 16 μs LBT before it attempts to transmit the second PUSCH, and the UE may perform the 25 μs LBT for the second type of channel access procedure for the second PUSCH. If the 25 μs LBT succeeds before the UE attempts to transmit the second PUSCH, the UE may transmit the PUSCH 2~PUSCH 4 continuously. If the 25 μs LBT fails before the UE attempts to transmit the second PUSCH, the UE may perform the 25 μs LBT before it attempts to transmit the third PUSCH. If succeeds, the PUSCH 3 and PUSCH 4 may be transmitted continuously, and so on. If the 25 μs LBT still fails before the UE attempts to transmit the fourth PUSCH, the UE may not transmit any one of the PUSCH 1~PUSCH 4. In this example, if the 16 μs LBT fails before the UE attempts to transmit the first PUSCH, the time difference between the start point at which the UE may start to transmit the uplink signal next time and the ending position of the downlink transmission in the first half of the slot n+3 is greater than 16 μs, therefore the 16 μs LBT could not be performed. At the same time, because the start point at which the UE may start to transmit the uplink signal next time and the ending position of the uplink signal are within the same downlink COT, the UE may perform the 25 μs LBT for the second type. In some practical scenes, if the start point at which the UE may start to transmit the uplink signal next time or the ending position of the uplink signal is outside the downlink COT, the UE is required to perform the first type of channel access procedure. As another example, the base station occupies the channel through the first type of channel access procedure, starts the downlink transmission at the slot n, and the downlink COT continues to the slot n+6 and ends. The base station transmits one UL grant at the slot n+1 to schedule M=4 PUSCHs, wherein the first PUSCH starts from the eighth symbol in the slot n+3 and tills to the end of the slot n+3. The $2^{nd}$~$4^{th}$ PUSCHs occupy the corresponding entire slots among the slots n+4~n+6, respectively, and are continuous in time. If the base station indicates in the UL grant that the channel access type is the third type of channel access procedure, the UE needs no LBT and starts to transmit these 4 PUSCHs continuously from the first PUSCH. As another example, if the base station indicates in the UL grant that the channel access type is the 25 μs LBT for the second type of channel access procedure, the UE attempts the 25 μs LBT before the transmitting of the first PUSCH begins, if succeeds, the 4 PUSCHs are transmitted continuously, otherwise, the UE may attempt the 25 μs LBT again before the transmitting of the second PUSCH begins, and so on.

According to another implementation, the base station can not indicate the certain channel access type A in the UL grant scheduling the M>1 PUSCHs. The base station may only indicate the certain channel access type C in the UL grant scheduling the M>1 PUSCHs. Then, the UE processes in accordance with the steps for the channel access type C described above. There are certain limitations on such method, but the base station still can indicate the certain channel access type A through the UL grant scheduling the single PUSCH. The implementation of such method is simple.

Similarly, the base station may schedule a plurality of continuous PUSCHs in time through a plurality of UL grants. When the channel access types indicated in each of the UL grants are same, if the indicated channel access type is the certain channel access type A and if the UE does not succeed to access to the channel before the jth PUSCH is transmitted, then the UE could not access to the channel according to the indicated channel access type A before the (j+1) PUSCH is transmitted, but may access to the channel according to the channel access type B. If the indicated channel access type is the certain channel access type C and if the UE does not succeed to access to the channel before the jth PUSCH is transmitted, the UE may access to the channel according to the channel access type C indicated in the UL grant before the (j+1) PUSCH is transmitted.

For example, if the base station transmits 4 UL grants each scheduling one PUSCH, and the time resources in these 4 PUSCH are continuous. Given that the information on the channel access types indicated in the UL grants scheduling the PUSCHs whose time resources are continuous must be same, then, when the channel access type indicated in these UL grants by the base station is the 16 μμs LBT for the second type of channel procedure, if the UE fails to access to the channel before the first PUSCH is transmitted, then the UE could not access to the channel according to the indicated 16 μs LBT for the second type of channel procedure before the second PUSCH is transmitted and has to access to the channel according to the 25 μs LBT for the second type of channel procedure, that is to say, in this case, the UE may switch to the more conserved channel access type than the indicated channel access type. If the channel access type indicated in the UL grant is the first type, or the 25 μs LBT for the second type, or the third type of channel access type, then the UE attempts to the transmitting of the next PUSCH according to the channel access type indicated in the UL grant after the channel access of the first PUSCH fails. If the channel access is succeeded before the next PUSCH starts, the remaining PUSCHs are transmitted continuously. If it is assumed that the information on the channel access types indicated in the UL grants scheduling the PUSCHs whose time resources are continuous may be different, the UE accesses to the channel according to the channel access type indicated in the UL grant scheduling the jth PUSCH before the jth PUSCH starts, and if succeeds, the reaming PUSCHs may be transmitted starting from the jth PUSCH without the LBT.

The above is only a part of the embodiments of the present invention, and it should be noted that those skilled in the art can also make several improvements and retouchings without departing from the principles of the present invention, which should be regarded as the scope of protection of the present invention.

The invention claimed is:

1. A method performed by a terminal in a communication system, the method comprising:
    transmitting a physical uplink shared channel (PUSCH) to a base station;
    receiving, from the base station, a physical downlink control channel (PDCCH) including a hybrid automatic repeat request (HARQ)-acknowledgment (ACK) information; and
    identifying whether the HARQ-ACK information is valid for the PUSCH based on a time interval between a PDCCH reception and a PUSCH transmission,
    wherein the HARQ-ACK information is identified to be valid for the PUSCH in case that the PDCCH reception is after minimum duration from the PUSCH transmission.

2. The method of claim 1, wherein, in case that the PUSCH is transmitted with repetition:
    the HARQ-ACK information corresponding to ACK is identified to be valid for the PUSCH in case that the PDCCH reception is after the minimum duration from a first PUSCH transmission, and
    the HARQ-ACK information corresponding to negative ACK (NACK) is identified to be valid for the PUSCH in case that the PDCCH reception is after the minimum duration from a last PUSCH transmission.

3. The method of claim 1, wherein a contention window value for a channel access procedure is adjusted based on the HARQ-ACK information identified to be valid for the PUSCH.

4. The method of claim 1, wherein the minimum duration is configured by the base station to the terminal.

5. A method performed by a base station in a communication system, the method comprising:
    receiving a physical uplink shared channel (PUSCH) from a terminal; and
    transmitting, to the terminal, a physical downlink control channel (PDCCH) including a hybrid automatic repeat request (HARQ)-acknowledgement (ACK) information,
    wherein a validity of the HARQ-ACK information for the PUSCH is based on a time interval between a PDCCH reception of the terminal and a PUSCH transmission of the terminal, and
    wherein the HARQ-ACK information is valid for the PUSCH in case that the PDCCH reception of the terminal is after minimum duration from the PUSCH transmission of the terminal.

6. The method of claim 5, wherein, in case that the PUSCH is received with repetition:
    the HARQ-ACK information corresponding to ACK is valid for the PUSCH in case that the PDCCH reception of the terminal is after the minimum duration from a first PUSCH transmission of the terminal, and
    the HARQ-ACK information corresponding to negative ACK (NACK) is valid for the PUSCH in case that the PDCCH reception of the terminal is after the minimum duration from a last PUSCH transmission of the terminal.

7. The method of claim 5, wherein a contention window value for a channel access procedure is adjusted based on the HARQ-ACK information valid for the PUSCH.

8. The method of claim 5, wherein the minimum duration is configured by the base station to the terminal.

9. A terminal in a communication system, the terminal comprising:
    a transceiver; and
    a controller configured to:
        transmit a physical uplink shared channel (PUSCH) to a base station;
        receive, from the base station, a physical downlink control channel (PDCCH) including a hybrid automatic repeat request (HARQ)-acknowledgment (ACK) information; and
        identify whether the HARQ-ACK information is valid for the PUSCH based on a time interval between a PDCCH reception and a PUSCH transmission,
    wherein the HARQ-ACK information is identified to be valid for the PUSCH in case that the PDCCH reception is after minimum duration from the PUSCH transmission.

10. The terminal of claim 9, wherein, in case that the PUSCH is transmitted with repetition:
    the HARQ-ACK information corresponding to ACK is identified to be valid for the PUSCH in case that the PDCCH reception is after the minimum duration from a first PUSCH transmission, and
    the HARQ-ACK information corresponding to negative ACK (NACK) is identified to be valid for the PUSCH in case that the PDCCH reception is after the minimum duration from a last PUSCH transmission.

11. The terminal of claim 9, wherein a contention window value for a channel access procedure is adjusted based on the HARQ-ACK information identified to be valid for the PUSCH.

12. The terminal of claim 9, wherein the minimum duration is configured by the base station to the terminal.

13. A base station in a communication system, the base station comprising:
    a transceiver; and
    a controller configured to:
        receive a physical uplink shared channel (PUSCH) from a terminal; and
        transmit, to the terminal, a physical downlink control channel (PDCCH) including a hybrid automatic repeat request (HARQ)-acknowledgement (ACK) information,
    wherein a validity of the HARQ-ACK information for the PUSCH is based on a time interval between a PDCCH reception of the terminal and a PUSCH transmission of the terminal, and
    wherein the HARQ-ACK information is valid for the PUSCH in case that the PDCCH reception of the terminal is after minimum duration from the PUSCH transmission of the terminal.

14. The base station of claim 13, wherein, in case that the PUSCH is received with repetition:
    the HARQ-ACK information corresponding to ACK is valid for the PUSCH in case that the PDCCH reception of the terminal is after the minimum duration from a first PUSCH transmission of the terminal, and the HARQ-ACK information corresponding to negative ACK (NACK) is valid for the PUSCH in case that the PDCCH reception of the terminal is after the minimum duration from a last PUSCH transmission of the terminal.

15. The base station of claim 13, wherein a contention window value for a channel access procedure is adjusted based on the HARQ-ACK information valid for the PUSCH.

* * * * *